(12) United States Patent
Mukherjee et al.

(10) Patent No.: US 12,160,178 B2
(45) Date of Patent: Dec. 3, 2024

(54) SOFT-SWITCHED RESONANT DC-DC CONVERTER WITH WIDE GAIN RANGE

(71) Applicant: Delta Electronics, Inc., Taipei (TW)

(72) Inventors: Satyaki Mukherjee, Research Triangle Park, NC (US); Chi Zhang, Research Triangle Park, NC (US); Tomas Sadilek, Research Triangle Park, NC (US); Misha Kumar, Research Triangle Park, NC (US); Boyi Zhang, Research Triangle Park, NC (US); Peter Mantovanelli Barbosa, Research Triangle Park, NC (US)

(73) Assignee: Delta Electronics, Inc., Taipei (TW)

( * ) Notice: Subject to any disclaimer, the term of this patent is extended or adjusted under 35 U.S.C. 154(b) by 335 days.

(21) Appl. No.: 17/861,157

(22) Filed: Jul. 8, 2022

(65) Prior Publication Data

US 2024/0014743 A1    Jan. 11, 2024

(51) Int. Cl.
*H02M 3/335*    (2006.01)
*H02M 1/00*    (2006.01)
*H02M 3/00*    (2006.01)

(52) U.S. Cl.
CPC ..... *H02M 3/33592* (2013.01); *H02M 1/0009* (2021.05); *H02M 1/0058* (2021.05); *H02M 3/01* (2021.05); *H02M 3/33573* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 7,518,886 B1 * 4/2009 Lai ................. H02M 1/14
                                                    363/71
10,356,861 B2 * 7/2019 Safaee ............... H05B 45/10
(Continued)

FOREIGN PATENT DOCUMENTS

CN    107482918 A    12/2017
CN    111799897 A    10/2020
(Continued)

OTHER PUBLICATIONS

Guo, Zhiqiang, Triple-Phase Shift Modulation Scheme of DAB Converter With LCL Resonant Tank, IEEE, Jun. 2022, pp. 1734-1747.
(Continued)

*Primary Examiner* — Thienvu V Tran
*Assistant Examiner* — Nusrat Quddus
(74) *Attorney, Agent, or Firm* — KIRTON McCONKIE; Evan R. Witt

(57) ABSTRACT

A novel phase-shift based modulation strategy is disclosed that enables a DC-DC converter to operate with zero voltage-switching (ZVS) across wide voltage and power range. The converter operates at a fixed fundamental frequency, with the output current controlled based on an amount of phase shift of the fundamental component at the output of an inverter portion of the converter. To achieve soft switching a rectifier portion of the converter is controlled to phase shift the fundamental component of the rectifier voltage observed at a rectifier reference terminal. More specifically, by requiring a phase shift of the voltage at the rectifier terminal relative to the output voltage of the inverter, the inverter current is such that ZVS is achieved. A converter and method are provided to implement DC-DC conversion with soft switching.

21 Claims, 26 Drawing Sheets

(58) Field of Classification Search
CPC ............... H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/073; H02M 3/10; H02M 3/135; H02M 3/137; H02M 3/315; H02M 3/3155; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02M 1/12; H02M 7/1557; H02M 7/1626; H02M 1/4208; H02M 7/219; H02M 7/151; H02M 1/4233; H02M 5/4585; H02M 7/1552; H02M 7/1623; H02M 1/4225; H02M 7/064; Y02B 70/1491; H02J 3/46; H02J 3/38; H02J 7/12; G05F 1/30; G05F 1/33; G05F 1/32; G05F 1/34; G05F 1/38; G05F 1/52

See application file for complete search history.

(56) References Cited

U.S. PATENT DOCUMENTS

| | | | | |
|---|---|---|---|---|
| 10,804,809 | B1* | 10/2020 | Yelaverthi | H02J 1/102 |
| 11,336,205 | B1* | 5/2022 | Brothers | H02M 7/4837 |
| 2017/0093269 | A1 | 3/2017 | Qiu et al. | |
| 2017/0324347 | A1 | 11/2017 | Xu et al. | |
| 2018/0198373 | A1* | 7/2018 | Torrico-Bascopé | H02M 1/083 |
| 2021/0408927 | A1* | 12/2021 | Zhang | H02M 3/01 |
| 2022/0085728 | A1* | 3/2022 | Mantooth | H02M 1/0058 |

FOREIGN PATENT DOCUMENTS

| | | |
|---|---|---|
| EP | 3852262 A1 | 7/2021 |
| TW | 200919923 A | 5/2009 |
| TW | 202008696 A | 2/2020 |

OTHER PUBLICATIONS

Yaqoob, Muhammad et al., Optimal Modulation for a Fifth-Order Dual-Active-Bridge Resonant Immittance DC-DC Converter, IEEE, Jan. 2020, pp. 70-82.

Khatua, Mausamjeet et al., Design and Control of a Dual-Bridge Series-Resonant Converter based Onboard EV Charger, IEEE, 2022.

Zhang, Chi et al., A Novel Three-level Phase-Shift Modulation for Serial Half Bridge LLC Resonant Converter, IEEE, 2021, pp. 355-362.

Mangesh Borage, et al., "Resonant Immittance Converter Topologies," IEEE Transactions on Industrial Electronics, vol. 58, No. 3, pp. 971-978 (Mar. 2011).

Mangesh. Borage, et al., "Analysis and design of an LCL-T resonant converter as a constant-current power supply," IEEE Transactions on Industrial Electronics, vol. 52, No. Dec. 6, 2005).

S. Habib, et al., "A Comprehensive Study of Implemented International Standards, Technical Challenges, Impacts and Prospects for Electric Vehicles," IEEE Access, vol. 6, pp. 13866-13890 (Mar. 6, 2018).

Mausamjeet Khatua, et al., "Closed-Loop Control of LCL-T Resonant DC-DC Converter Operating as Automotive LED Driver," IEEE Energy Conversion Congress and Exposition (ECCE) (Sep. 1, 2019).

Satyaki Mukherjee, et al., "Optimal Control of a Wide Range Resonant DC-DC Converter," 2020 IEEE Applied Power Electronics Conference and Exposition (APEC) (Mar. 2020).

R. W. Erickson, "Fundamentals of Power Electronics," Ch. 19, Resonant Conversion, pp. 659-710, Springer Science +Business Media Dordrecht (1997).

Chi Zhang, et al., "DC-link Capacitor Voltage Balancing Control for Series Half Bridge LLC Resonant Converter," 2020 IEEE Applied Power Electronics Conference and Exposition (APEC) (Mar. 2020).

* cited by examiner

SOFT-SWITCHED RESONANT DC-DC CONVERTER WITH WIDE GAIN RANGE

TECHNICAL FIELD

The present disclosure relates to a three-element resonant converter adapted to operate over wide output voltage and power ranges using three-level inverter and rectifier voltages that can be synthesized using a variety of switching cells acting as inverter and/or rectifier. More particularly, the present disclosure relates to a phase-shift based modulation strategy that enables the converter to operate with zero voltage-switching across wide voltage and power range—all the way down to approximately 5% of the rated converter power.

RELATED ART

With the recent advent of wide band gap semiconductors, high frequency operation of power supplies is becoming increasingly popular leading to reduction of passive component volume and resulting in high power density converters while keeping the converter efficiency high. In order to fully utilize the potential of wide band gap semiconductors and their fast switching speed, soft-switching needs to be enabled by circuit design to avoid significant switching losses, which include voltage and current overlap loss and hard charging loss associated with the parasitic junction capacitor of the semiconductors. Hence, soft-switching high frequency resonant DC-DC converters are increasingly gaining traction in the power electronics industry. In addition, the proper use of inverter and rectifier modulation strategies further enables application of lower voltage rated devices without significant cost or added complexity.

FIG. 1A shows a LCL-T resonant converter with a stacked half-bridge inverter. In this particular case, all switching devices $Q_1$-$Q_4$ need to block only one half of input voltage $V_{IN}/2$. The rectifier is shown in a standard full bridge configuration where each device needs to block full output voltage $V_{OUT}$. An implementation with stacked half bridge rectifier is shown in FIG. 1, where the device blocking voltage for rectifier switches are also reduced to one half of output voltage $V_{OUT}$. Central to this type of resonant converter is a "T"-type network including inductors $L_1$, $L_2$, and capacitor $C_r$. It should be noted that there are additional blocking capacitors in the circuit diagram referenced as $C_B$, which provide DC blocking functionality but do not participate in the resonance operation, since their value is much greater than $C_r$. The LCL-T resonant converter, redrawn under fundamental harmonic approximation in FIG. 1C, falls under a certain class of resonant converters known as immittance resonant converters [1]. The fundamental harmonic analysis can be applied to any inverter and rectifier configuration including the two particular realizations shown in FIGS. 1A and 1B. In this three-element resonant network, there is only one resonant frequency and the switching frequency of the converter is equal to the resonant frequency:

$$f_r = f_s = \frac{1}{2\pi\sqrt{C_r L}}; L_1 = L_2 = L \quad (1)$$

These resonant networks, when designed according to Eq. (1), can provide fixed voltage to current gain suitable for battery charging applications using a constant current power supply [2]. However, batteries for many applications require not only constant current mode of charging but also charging in constant power and constant voltage mode [3]. The requirement of constant power and constant voltage mode of charging poses control problems for immittance network based resonant converters. For a multiple element resonant tank such as the LCL-T network, it is difficult to control the converter with switching frequency control.

Fixed frequency control methods utilizing phase-shift between inverter and rectifier bridges have been mentioned in literature for immittance networks [4,5]. These control methods suffer from increased conduction losses as well as higher voltage-current overlap losses during turn-off, while maintaining Zero Voltage Switching (ZVS) turn-on.

REFERENCES

[1] M. Borage, K. V. Nagesh, M. S. Bhatia and S. Tiwari, "Resonant Immittance Converter Topologies," in IEEE Transactions on Industrial Electronics

[2] M. Borage, S. Tiwari and S. Kotaiah, "Analysis and design of an LCL-T resonant converter as a constant-current power supply," in IEEE Transactions on Industrial Electronics

[3] S. Habib, M. M. Khan, F. Abbas, L. Sang, M. U. Shahid and H. Tang, "A Comprehensive Study of Implemented International Standards, Technical Challenges, Impacts and Prospects for Electric Vehicles," in IEEE Access

[4] M. Khatua et al., "Closed-Loop Control of LCL-T Resonant DC-DC Converter Operating as Automotive LED Driver," 2019 IEEE Energy Conversion Congress and Exposition (ECCE)

[5] S. Mukherjee, A. Sepahvand, V. Yousefzadeh, M. Doshi and D. Maksimović, "Optimal Control of a Wide Range Resonant DC-DC Converter," 2020 IEEE Applied Power Electronics Conference and Exposition (APEC)

[6] Erickson R. W., Maksimović D. (2020) "Resonant Conversion. In: Fundamentals of Power Electronics," Springer, Cham. https://doi.org/10.1007/978-3-030-43881-4_22

[7] C. Zhang, Y. Jiao, Z. Shen and P. Barbosa, "DC-link Capacitor Voltage Balancing Control for Series Half Bridge LLC Resonant Converter," 2020 IEEE Applied Power Electronics Conference and Exposition (APEC)

SUMMARY

A phase-shift based modulation strategy is proposed which leverages three-level switching of inverter and rectifier bridges to simultaneously achieve output power and current regulation along with ZVS turn-on and near zero-current switching (ZCS) turn-off of all semiconductor devices to significantly reduce switching losses and also limit conduction losses. This control feature along with fixed frequency control makes this circuit well suited for any load profile. The proposed strategy can achieve all the aforementioned benefits, resulting in lower converter losses, even at light load operating conditions all the way down to nearly zero load. Some aspects relate to a multi-element resonant converter topology using an inverter and rectifier structure to enable DC-DC power conversion, operating with a fixed frequency but capable of operating across a wide range of output voltage and output power; synthesis of voltage waveforms at the input and output of the resonant tank which allows for simultaneous regulation of output power and current while maintaining zero voltage switching of all devices; implementation of the synthesized voltage waveforms using active devices and three-level or, "n" level (n=3, 4, 5 . . . etc.) modulation scheme; zero voltage switching of all devices is ensured by correctly synthesizing the inductor current phases connected to the inverter and rectifier switching nodes. This modulation scheme may be implemented using full bridge switching cell, stacked half bridge switching cell, flying capacitor switching cell, neutral point clamped switching cell or any other switching cells at the inverter and rectifier side capable of synthesizing "n" level voltage. The implementation of the same switching voltages can be done using multiple circuits such as flying capacitor multi-level switching cell, neutral point clamped switching cell (including active (active neutral point clamped, ANPC) and diode (diode neutral point clamped, DNPC)) etc. At the rectifier side two different kind of modulations may serve the same purpose of achieving soft switching with power regulation. Depending on the application requirements, two level or "n" level switching can be preferred to minimize conduction losses in the system. An extension of the proposed concept for any "n" level switching converter utilizing multi-level inverter and rectifier switching networks is also discussed.

According to one embodiment, a phase-shift based multi-level modulation strategy of a high-frequency three-element resonant converter, operating with fixed switching frequency, is disclosed which allows required regulation of output voltage and output power (output current) along with zero voltage switching over the entire load range. In conjunction with the symmetric resonant converter circuit, the proposed modulation strategy can be a very attractive solution for very wide range DC-DC isolated converters.

Another aspect relates to a DC-DC converter for delivering energy from a DC voltage source to a load while providing soft switching and current control. The DC-DC converter includes an inverter having a plurality of inverter switches, a voltage source terminal for connecting to the DC voltage source, and an inverter output terminal; a circuit including a resonant network, the circuit electrically connected to the inverter output terminal; a rectifier electrically connected to the circuit, the rectifier having a plurality of rectifier switches, a reference terminal, and a converter output terminal; and a controller operably connected to the plurality of inverter switches and operably connected to the plurality of rectifier switches. The controller includes a phase module to determine a temporal shift equivalent to a first phase shift, $\emptyset/2$, based at least in part on a reference quantity; an inverter control module to transmit a plurality of inverter control signals to the plurality of inverter switches, each inverter control signal for controlling a respective one or more of the inverter switches, the inverter control module to, during operation, change states of the plurality of inverter control signals in a first sequence to produce an inverter voltage signal at the inverter output terminal having a first fundamental frequency component with the first phase shift, $\emptyset/2$, relative to a first state change in the first sequence; and a rectifier control module to transmit a plurality of rectifier control signals to the plurality of rectifier switches, each rectifier control signal for controlling a respective one or more of the rectifier switches, the rectifier control module to, during operation, change states of the plurality of rectifier control signals in a second sequence to produce a rectifier voltage signal at the reference terminal, the rectifier voltage signal having a second fundamental frequency component, the second fundamental frequency component having a same frequency as the first fundamental frequency component, the second fundamental frequency component phase shifted by a second phase shift, $\psi$, relative to the first fundamental frequency component, where $(\pi+\emptyset)/2 \leq \psi \leq \pi + \emptyset/2$.

In some embodiments, the reference quantity is selected a group consisting of output current, current reference, input voltage, and output voltage reference.

Some embodiments further include a current sensor to measure an output current through the converter output terminal, wherein the reference quantity is the output current;

In some embodiments, the phase module includes a feedback loop that controls the first phase shift using an error signal that is a difference between a target output current and the measured output current.

Some embodiments further include a voltage sensor to measure an output voltage at the converter output terminal; and a non-transient computer-readable storage medium storing a target voltage-to-current relationship, wherein the phase module determines the target output current based on the measured output voltage and the target voltage-to-current relationship for the load.

In some embodiments, the rectifier further includes a plurality of relays electrically connected to the plurality of rectifier switches such that if the plurality of relays are in a first state the plurality of rectifier switches form a full bridge rectifier and if the plurality of relays are in a second state the plurality of rectifier switches form a stacked half bridge rectifier; and the controller operably connected to control the plurality of relays and further including a rectifier control module to signal to the plurality of rectifier switches to operate in the first state if the output voltage is greater than a threshold voltage and to signal to the plurality of rectifier switches to operate in the second state if the output voltage is below the threshold voltage.

In some embodiments, the resonant network is a two-port element including a first port with a positive first terminal and a negative first terminal; a second port with a positive second terminal and negative second terminal; a capacitor having a first end and a second end, the second end of the capacitor connected to the negative first terminal of the first port and the negative second terminal of the second port; a first inductor having a third end and a fourth end, the third end of the first inductor connected to the positive first terminal of the first port; and a second inductor having a fifth end and a sixth end, the sixth end of the second inductor connected to the positive second terminal of the second port, and the fifth end of the second inductor connected to the first end of the capacitor and the fourth end of the first inductor.

In some embodiments, the circuit further includes a transformer, and the resonant network of the circuit is electrically connected to the inverter output terminal and the transformer is electrically connected to the resonant network and the rectifier.

In some embodiments, the inverter control module is adapted to transmit inverter control signals, and each period of the inverter voltage signal substantially includes three or more discrete voltage levels. In some embodiments, at least two states of the plurality of inverter control signals produce a first one of the three or more discrete voltage levels and the first sequence output by the inverter control module cycles between the at least two states to produce the first one of the three or more discrete voltage levels.

In some embodiments, the rectifier control module is configured to transmit rectifier control signals such that each period of the rectifier voltage signal substantially includes two or more discrete voltage levels.

In some embodiments, the inverter is a stacked half bridge inverter; the plurality of inverter switches includes a first inverter switch and a second inverter switch; the plurality of inverter control signals includes a first inverter control signal operably connected to control the first inverter switch, and a second inverter control signal operably connected to control the second inverter switch; the controller's processor is configured to alternate each period T between (a) the first inverter control signal leading the second inverter control signal by a third phase shift, Ø, equal to twice the first phase shift, and (b) the second inverter control signal leading the first inverter control signal by the third phase shift, Ø.

Another aspect relates to a method for controlling a DC-DC converter having an inverter, resonant network, and rectifier. The method includes determining a temporal shift equivalent to a first phase shift, Ø/2, based at least in part on a reference quantity; transmitting a plurality of inverter control signals to control a plurality of inverter switches of the inverter in a first sequence to produce an inverter voltage signal having a first fundamental frequency component at an output terminal of the inverter, the first fundamental frequency component having the first phase shift, Ø/2, relative to a first state change in the first sequence; and transmitting a plurality of rectifier control signals to a plurality of rectifier switches of the rectifier in a second sequence to produce a rectifier voltage signal having a second fundamental frequency component at a reference terminal of the rectifier, the second fundamental frequency component having a same frequency as the first fundamental frequency component, the second fundamental frequency component phase shifted by a second phase shift, ψ, relative to the first fundamental frequency component, where $(\pi+\emptyset)/2 \leq \psi \leq \pi+\emptyset/2$.

In some embodiments, the method further includes measuring an output current through an output terminal of the DC-DC converter, wherein the determining the temporal shift the reference quantity is the output current.

In some embodiments, in said determining, the first phase shift is determined from a feedback loop from an error signal that is a difference between a target output current and the measured output current.

In some embodiments, the method further includes measuring an output voltage at the output terminal of the DC-DC converter; and determining the target output current based on the measured output voltage and a voltage-to-current relationship for a load connected to the output terminal of the DC-DC converter.

In some embodiments, the method further includes determining if the output voltage is greater than a threshold voltage; if the output voltage is greater than the threshold voltage sending a first plurality of relay control signals to a plurality of relays in the rectifier to configure the rectifier as a full bridge rectifier; and if the output voltage is less than the threshold voltage sending a second plurality of relay control signals to the plurality of relays in the rectifier to configure the rectifier as a stacked half bridge rectifier.

In some embodiments, in said transmitting the plurality of inverter control signals, each period of the inverter voltage signal substantially includes three or more discrete voltage levels.

In some embodiments, at least two states of the plurality of inverter control signals produce a same one of the three or more discrete voltage levels and the first sequence output by the inverter control module cycles between the at least two states.

In some embodiments, in said transmitting the plurality of rectifier control signals, each period of the rectifier voltage signal substantially includes two or more discrete voltage levels.

In some embodiments, in said transmitting the plurality of inverter control signals, the inverter voltage includes substantially three discrete voltage levels, namely, a low voltage level, a high voltage level, and an intermediate voltage level between the low voltage level and the high voltage level; and the first sequence produces at the output terminal of the inverter, for each period, T, of the inverter voltage, (A) the intermediate voltage level for a first time equal to $\emptyset T/(2\pi)$; (B) followed by the high voltage level for a second time equal to $(\pi-\emptyset)T/(2\pi)$; (C) followed by the intermediate voltage level for the first time; (D) followed by the low voltage level for the second time.

BRIEF DESCRIPTION OF THE DRAWINGS

FIGS. 1A and 1B show two different variations of the LCL-T resonant converter with different rectifier configurations and FIG. 1C shows the LCL-T resonant network under fundamental harmonic analysis. FIG. 1D illustrates the inverter and rectifier waveforms with conventional modulation schemes (two level inverter switching and synchronous rectification) existing in literature.

compared to inverter side voltage and current.

Figure 3A:
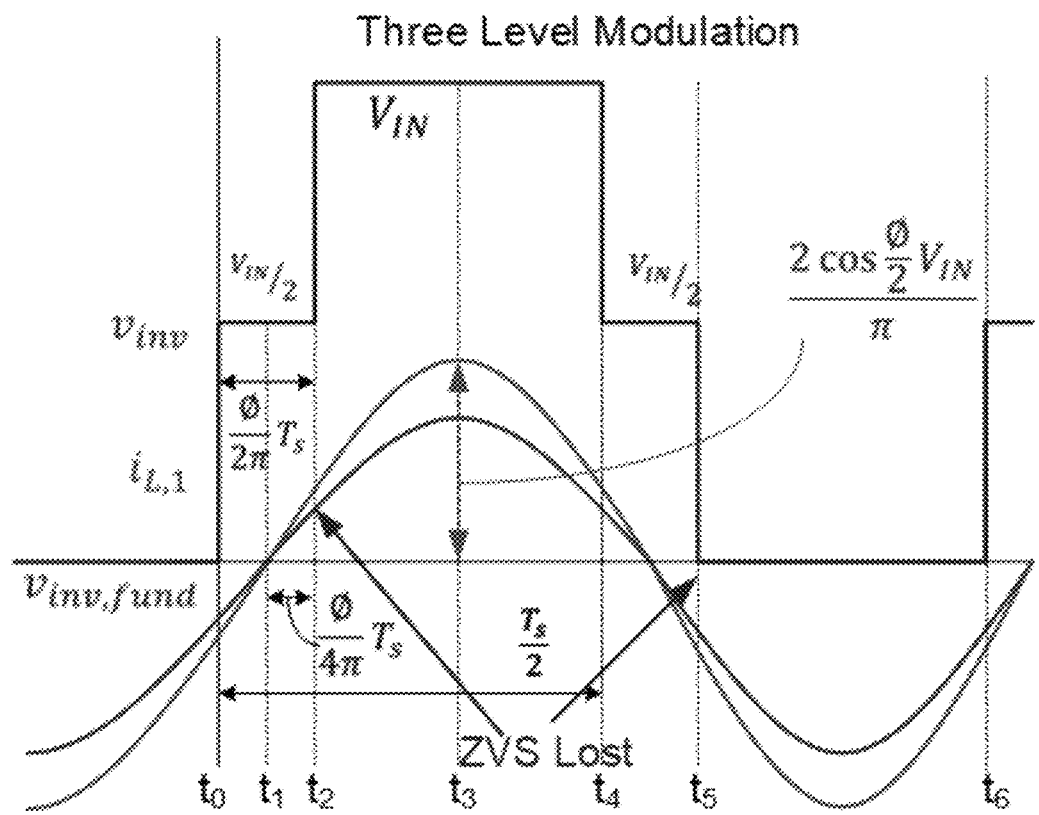
Figure 3B:
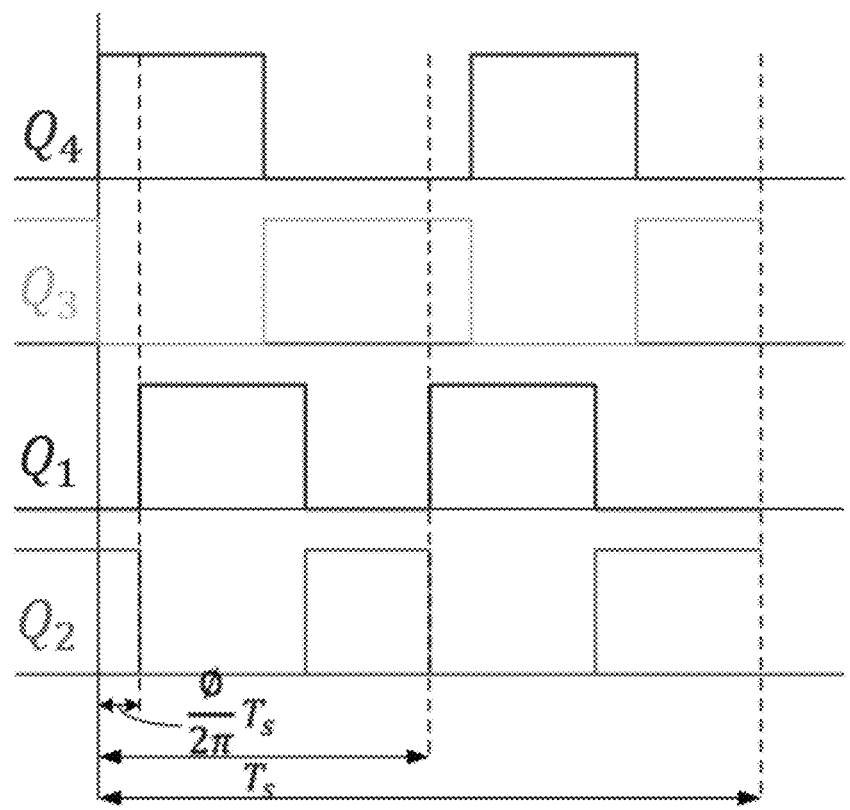

FIGS. 3A and 3B show one way to regulate the output power and output current in the LCL-T resonant converter using three-level modulation of the inverter circuit. Although, use of three-level modulation results in balanced rms current stress on the devices using the period doubling modulation strategy shown in FIG. 3B, if no other additional control is performed, ZVS can be lost on some of the inverter switches as indicated in FIG. 3A due to the opposing current polarity during 2 out of 4 switching instants in one period.

Figure 4A:
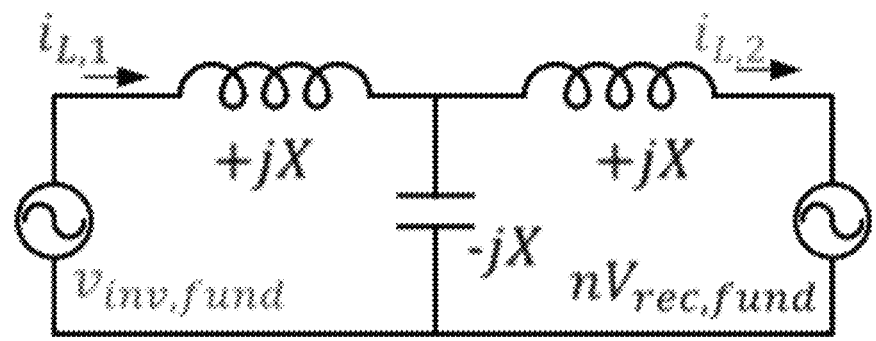
Figure 4B:
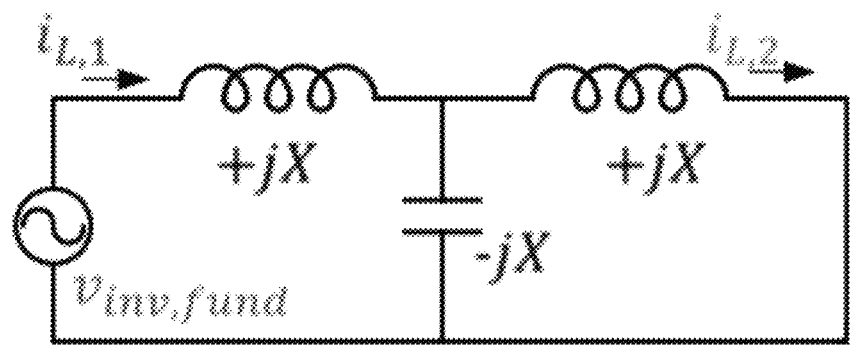
Figure 4C:
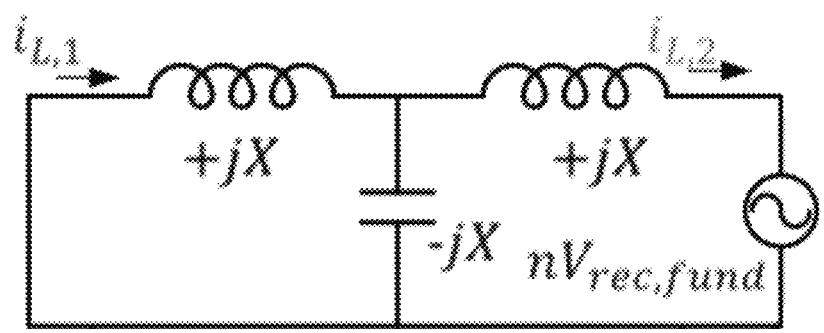

FIGS. 4A through 4C explain how superposition principle can be used to solve for the currents in the resonant tank. A salient property of the LCL-T resonant tank is the fact that $i_{L,2}$ depends only on $v_{inv,fund}$ and $i_{L,1}$ depends only on $v_{rec,fund}$. This property can be used to synthesize a current which enables ZVS of all the switches while maintaining regulation. FIG. 4A illustrates a linear circuit under fundamental harmonic approximation that can be solved using superposition principle for currents $i_{L,1}$ and $i_{L,2}$. FIG. 4B shows that the rectifier source is turned off and the circuit is analyzed with only the inverter source active. FIG. 4C shows that the inverter source is turned off and the circuit is analyzed with only the rectifier source active.

Figure 5:
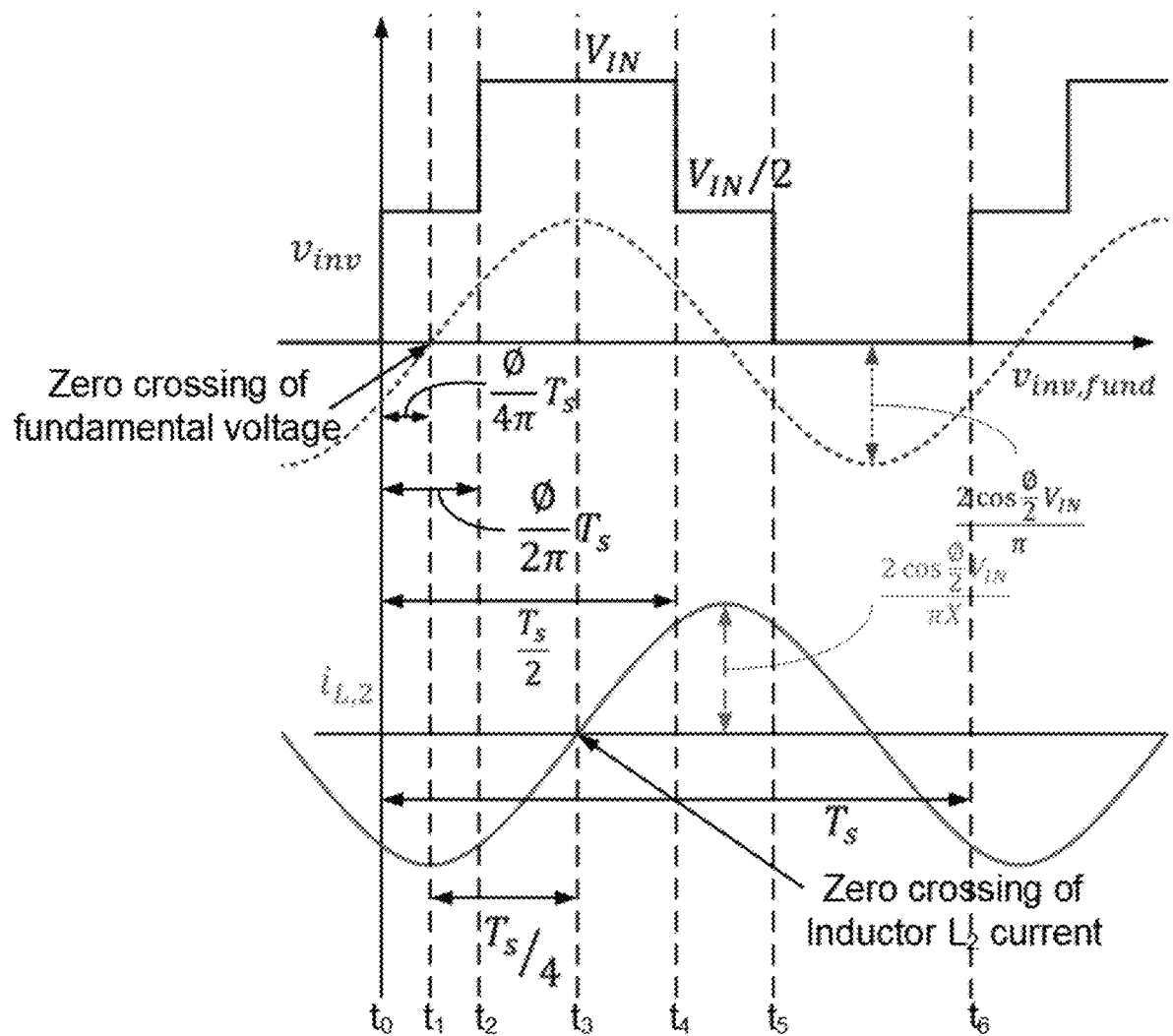

FIG. 5 shows the voltage impressed onto the resonant tank by a 3-level inverter located on the input side as well as its fundamental component. FIG. 5 further shows inductor current $i_{L,2}$.

Figure 6:
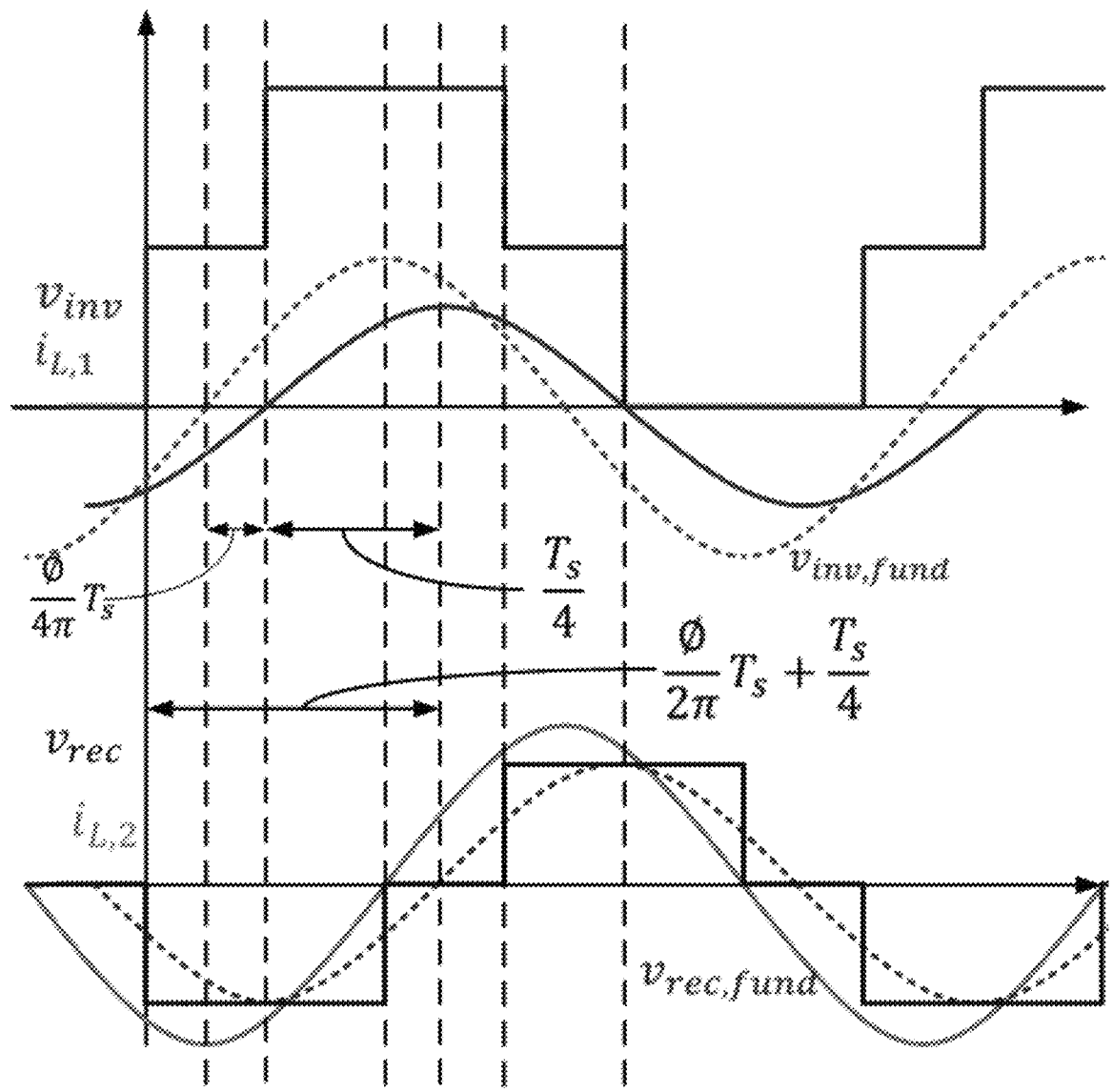

FIG. 6 next shows the three-level switching waveform on the rectifier side which enables ZVS transition of all the rectifier switching devices depending on current $i_{L,2}$. Fundamental harmonic of the rectifier switch node voltage $v_{rec,fund}$ is also shown here, which essentially results in the inductor current $i_{L,1}$ according to the superposition circuits shown in FIGS. 4A through 4C.

Figure 7:
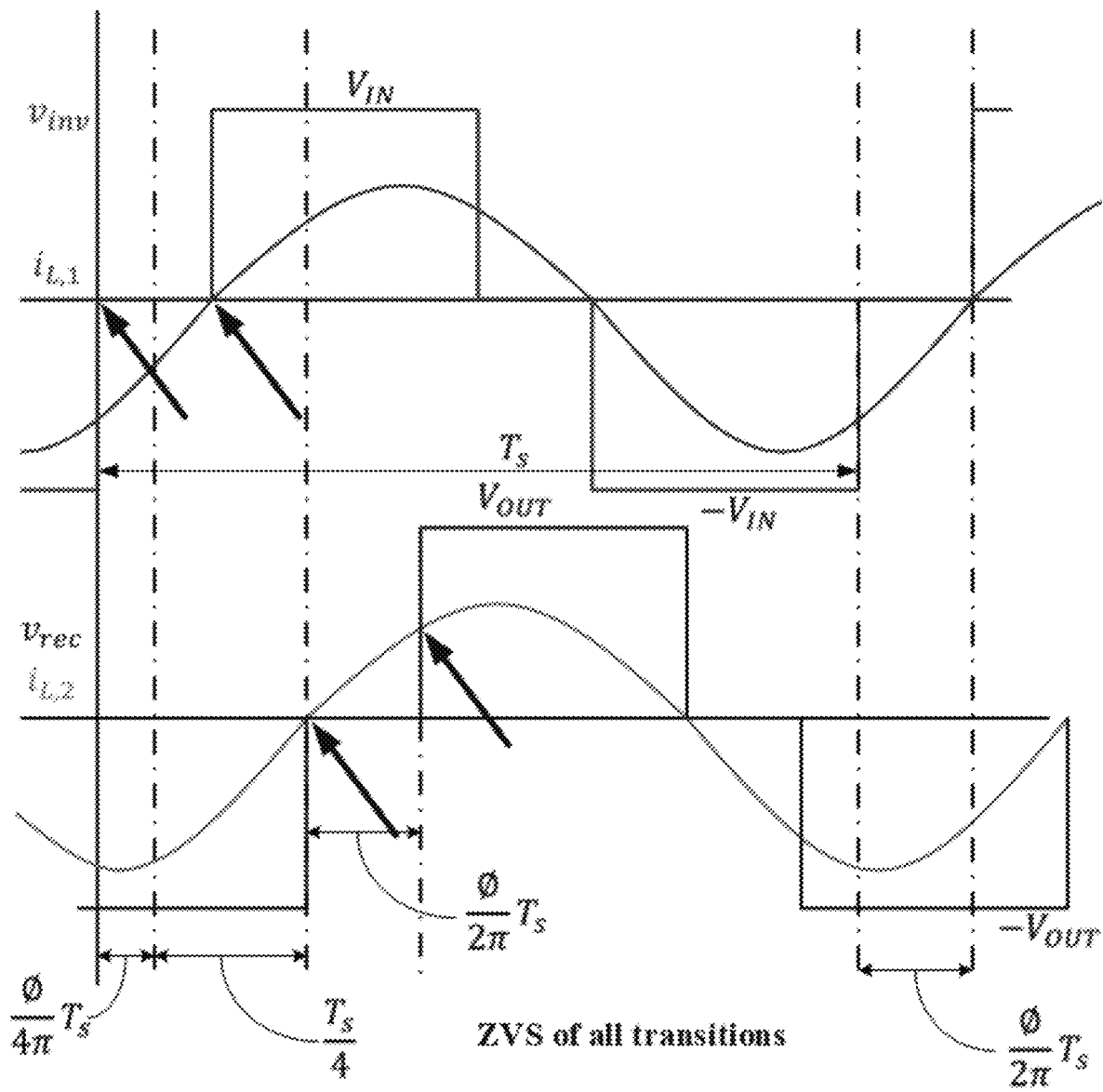

FIG. 7 summarizes the modulation strategy by showing all the waveforms in conjunction. In sharp contrast to FIG. 3A, all switching nodes achieve ZVS. Furthermore, output power and load voltage regulation can be achieved using a single control variable Ø.

Figure 8:
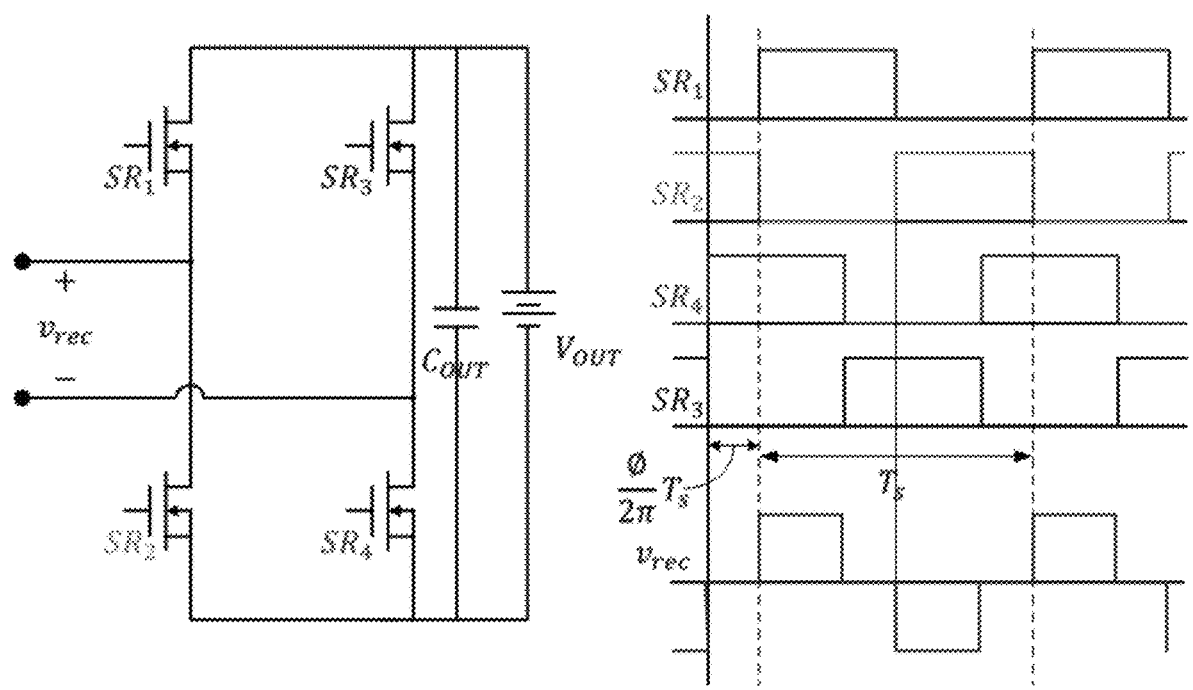

FIG. 8 shows the exemplary rectifier gate pulses in full bridge mode to generate three-level rectifier voltage node waveform.

Figure 9A:
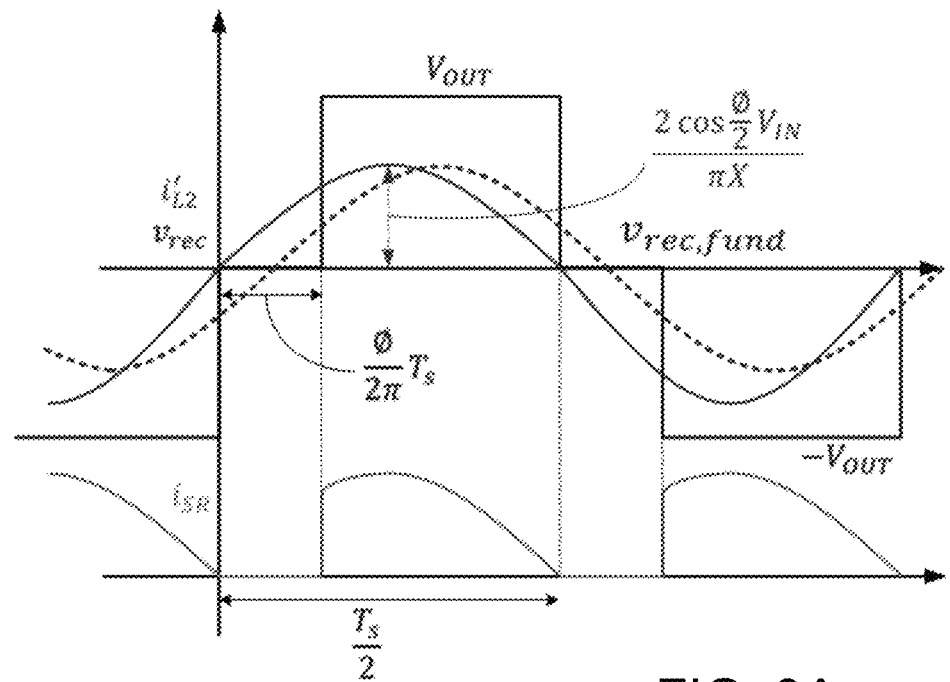
Figure 9B:
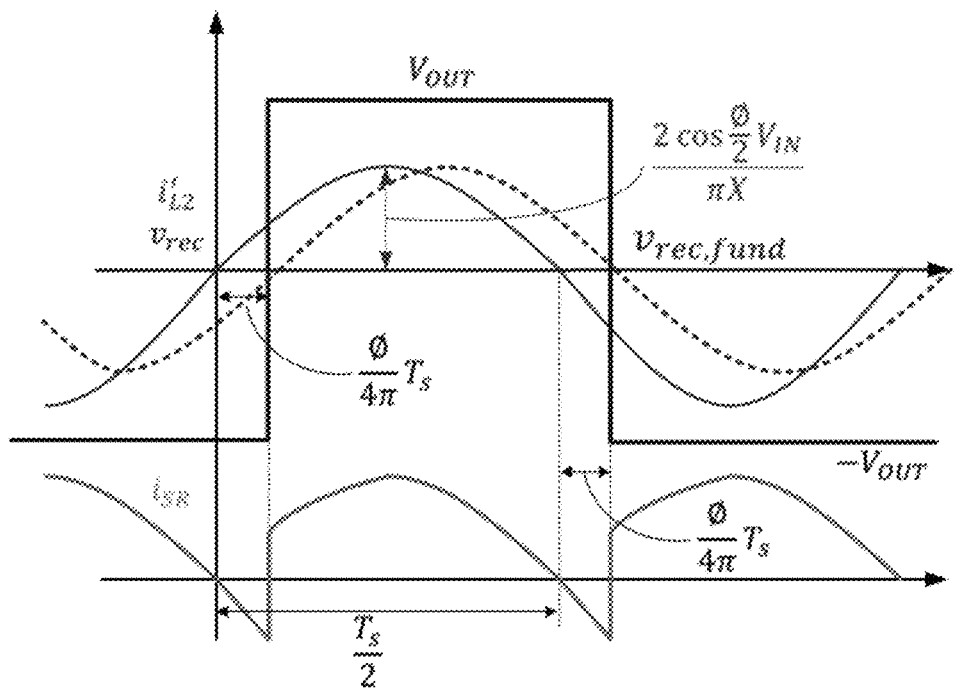

FIGS. 9A and 9B respectively show three-level and two-level output rectifier operation with phase-shift control and resulting waveforms of voltage impressed onto the resonant tank as well as inductor current $i_{L,2}$.

Figure 10:
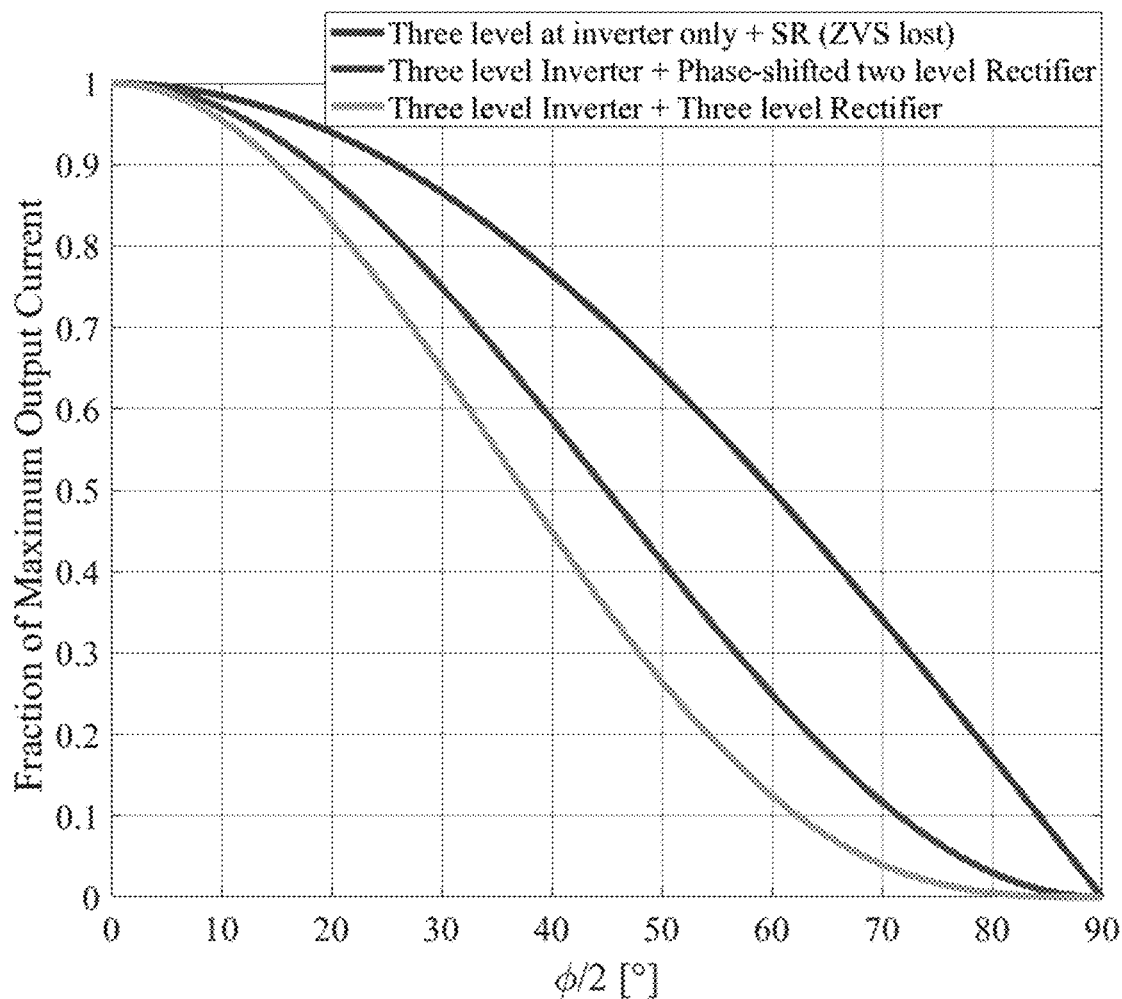

FIG. 10 shows the control sensitivity of converter output current as a function of control variable Ø for existing and proposed modulation techniques.

Figure 1A:
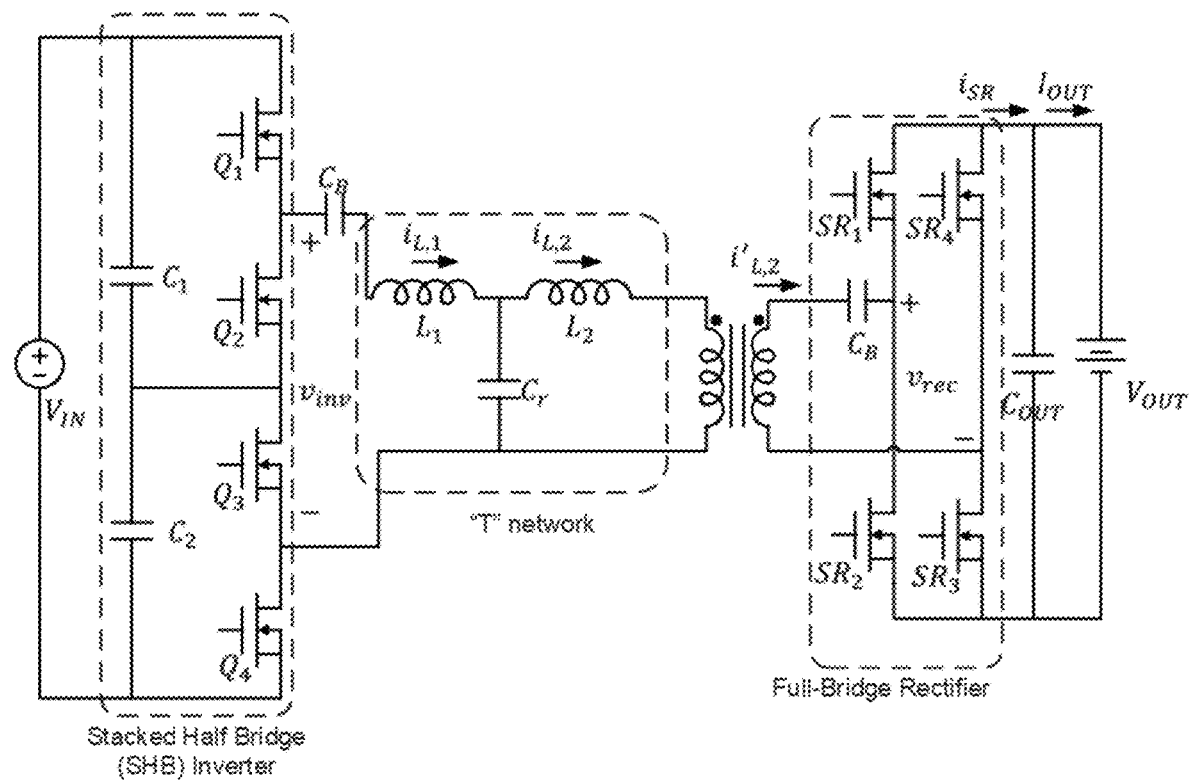
FIGS. 1A through 1D show an exemplary resonant converter including a LCL-T resonant network and a high frequency isolation transformer.
Figure 1B:
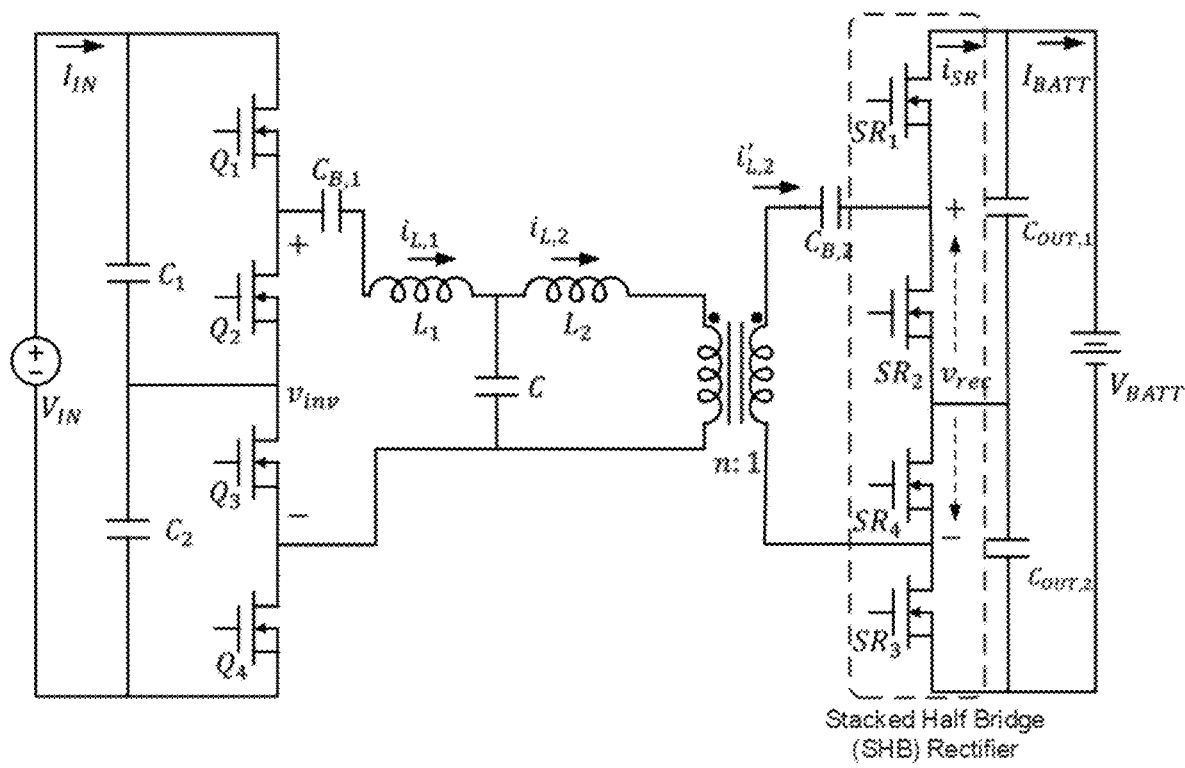
Figure 11:
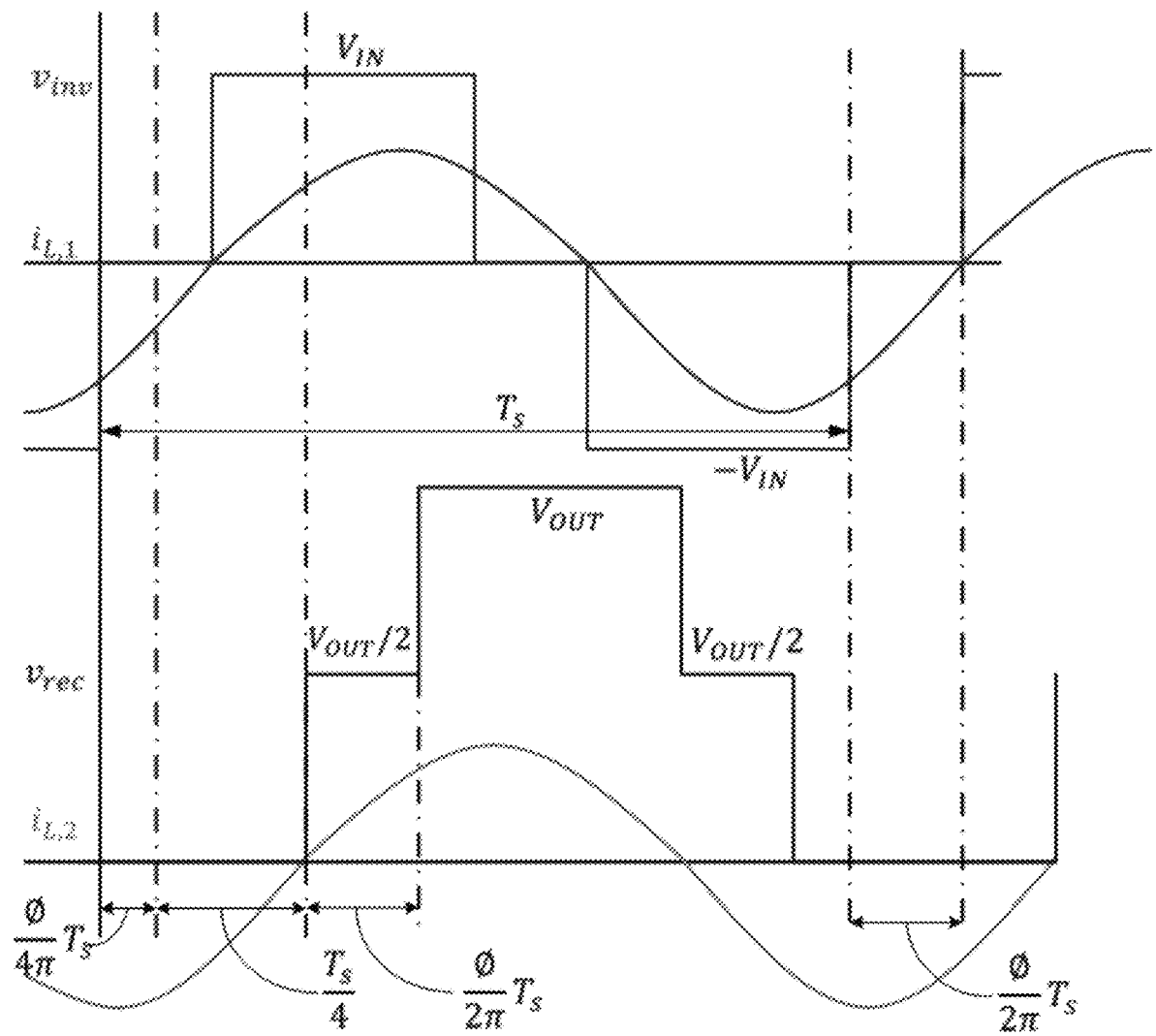

FIG. 11 illustrates the detailed timing diagram of the disclosed control strategy for a stacked half bridge rectifier operation shown in FIG. 1B. All devices achieve ZVS.

Figure 12:
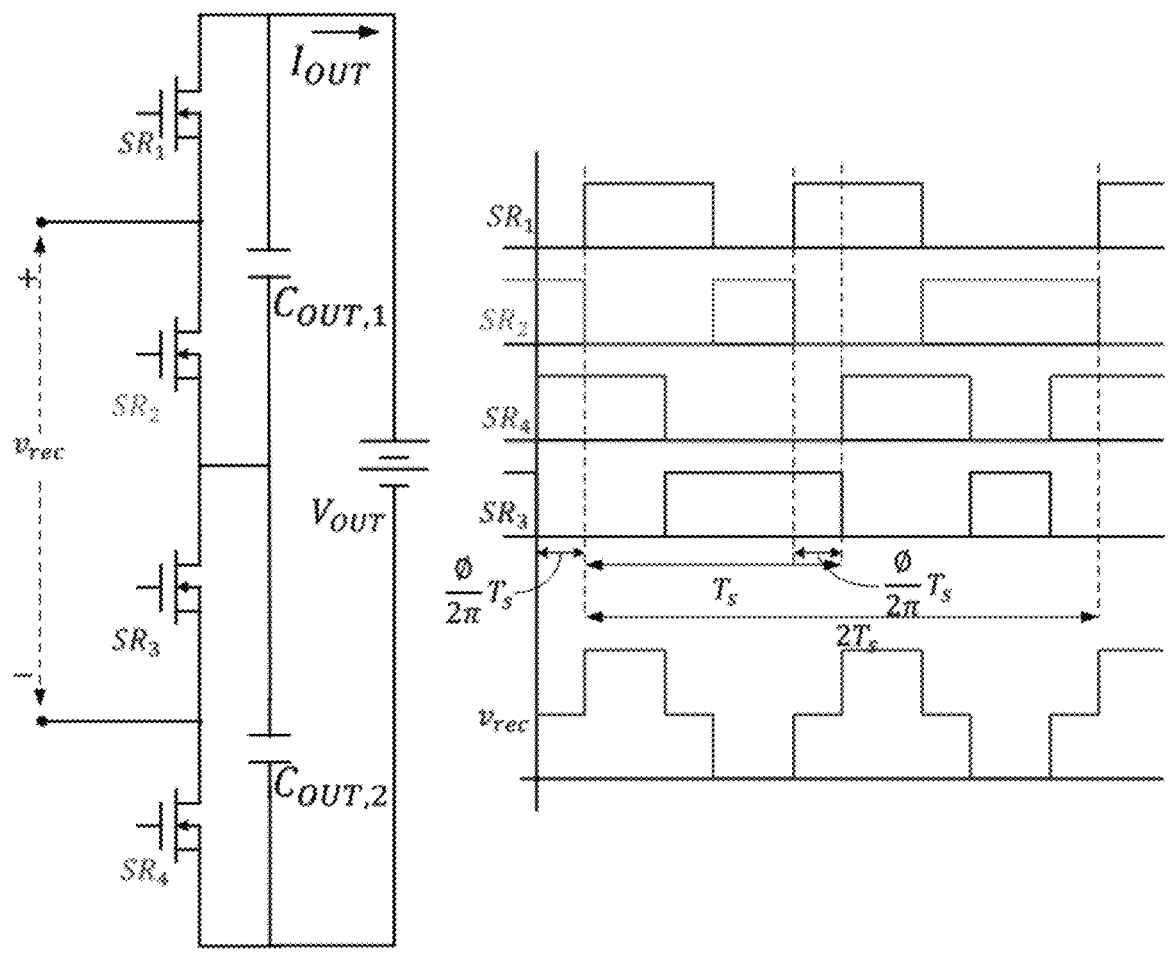

FIG. 12 shows the timing diagram of the three-level voltage waveform for stacked half bridge rectifier operation.

Figure 13A:
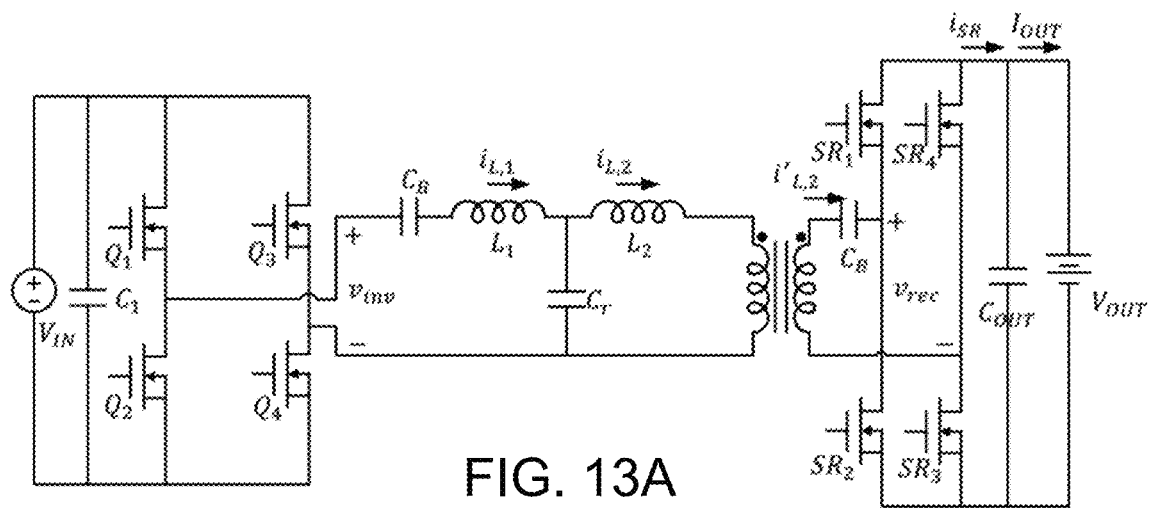
Figure 13B:
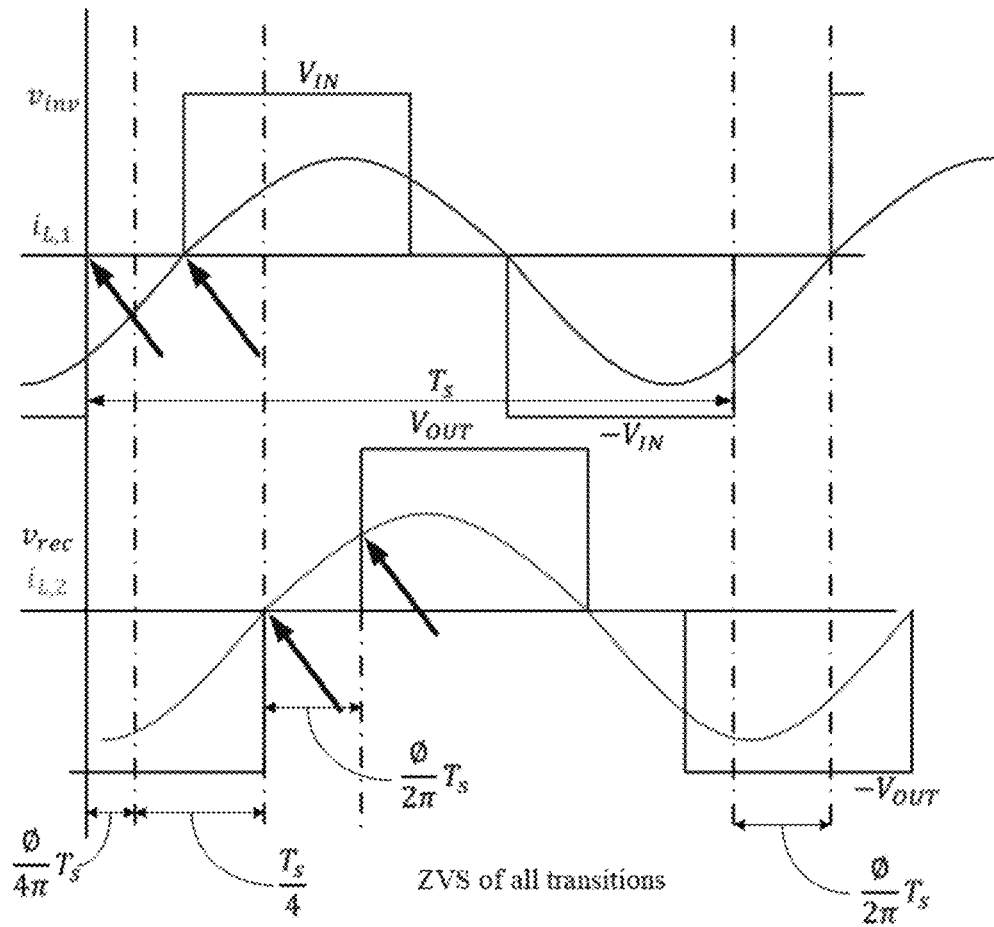
Figure 13C:
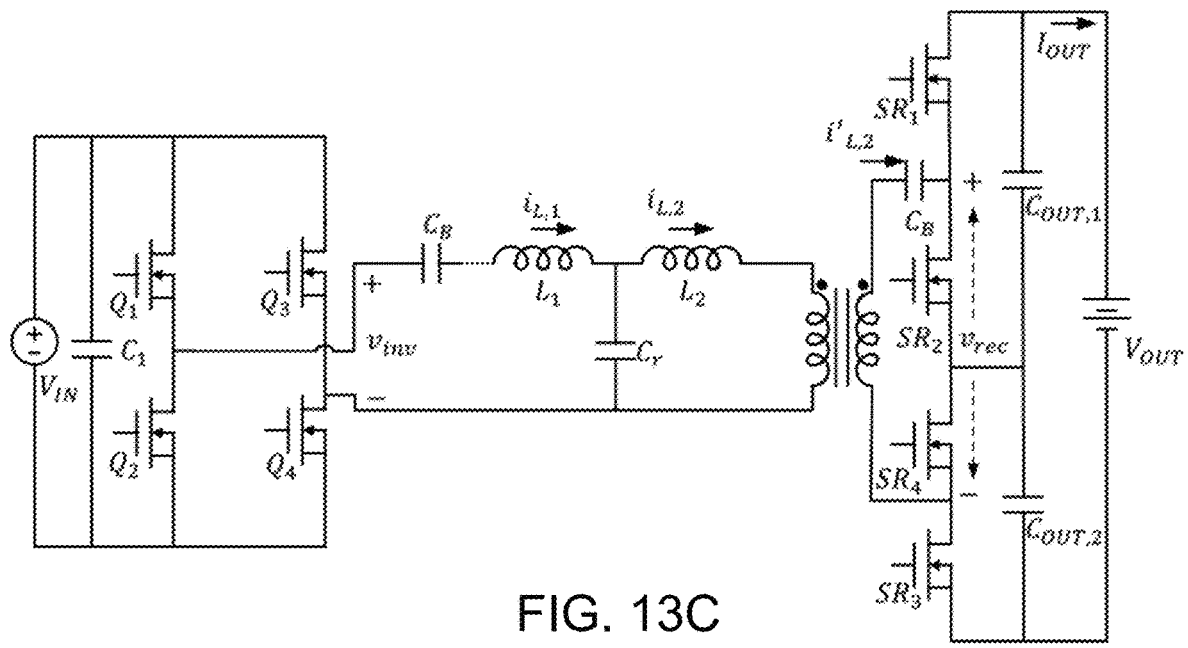
Figure 13D:
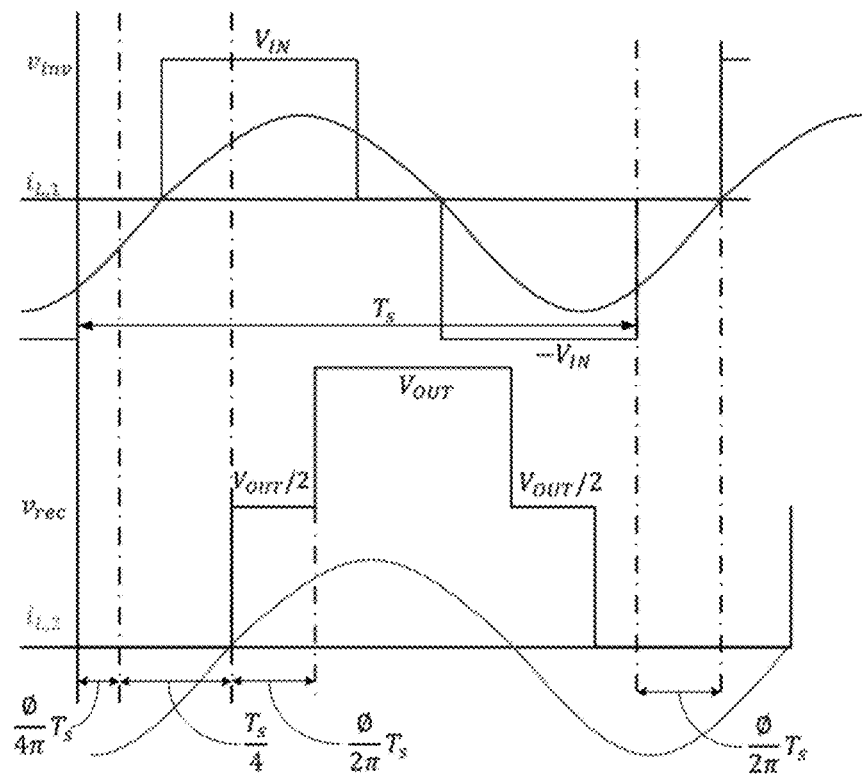

FIGS. 13A and 13C show two additional variations of DC-DC converter circuit that are capable of using the proposed modulation technique and achieve wide gain range operation. FIGS. 13B and 13D show the associated waveforms.

Figure 14:
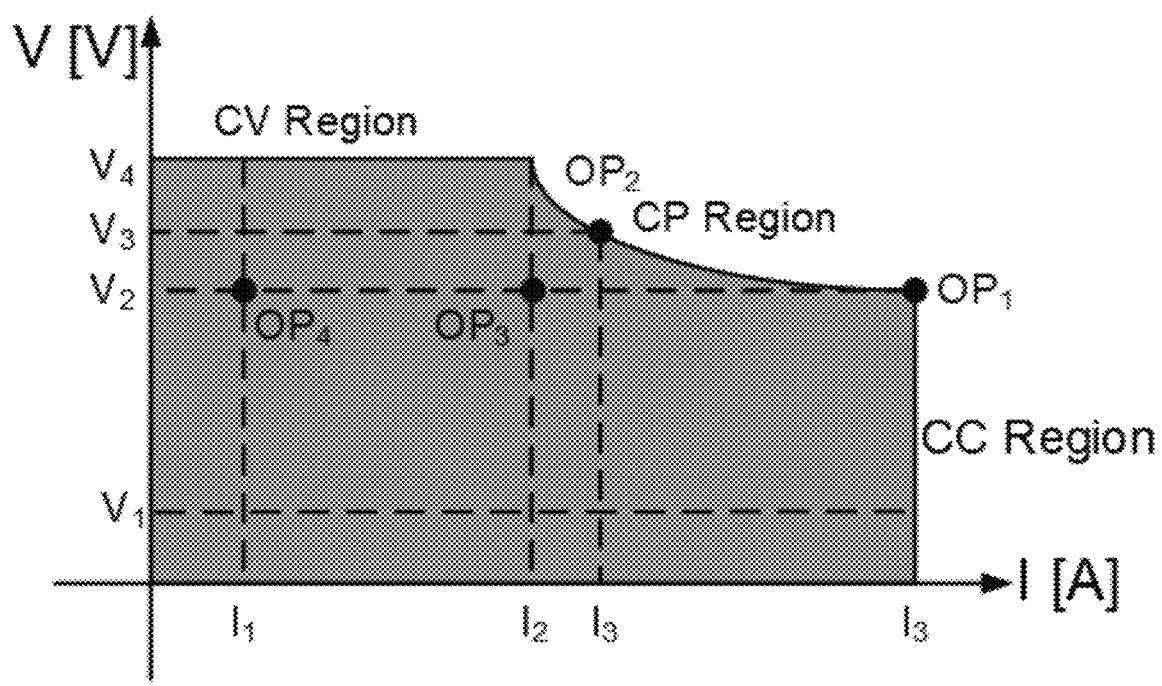

FIG. 14 demonstrates a typical V-I profile of a load, which includes constant current, constant voltage and constant power regions. In this load profile, 4 operating points are marked where output power and voltage regulations are required.

Figure 15:
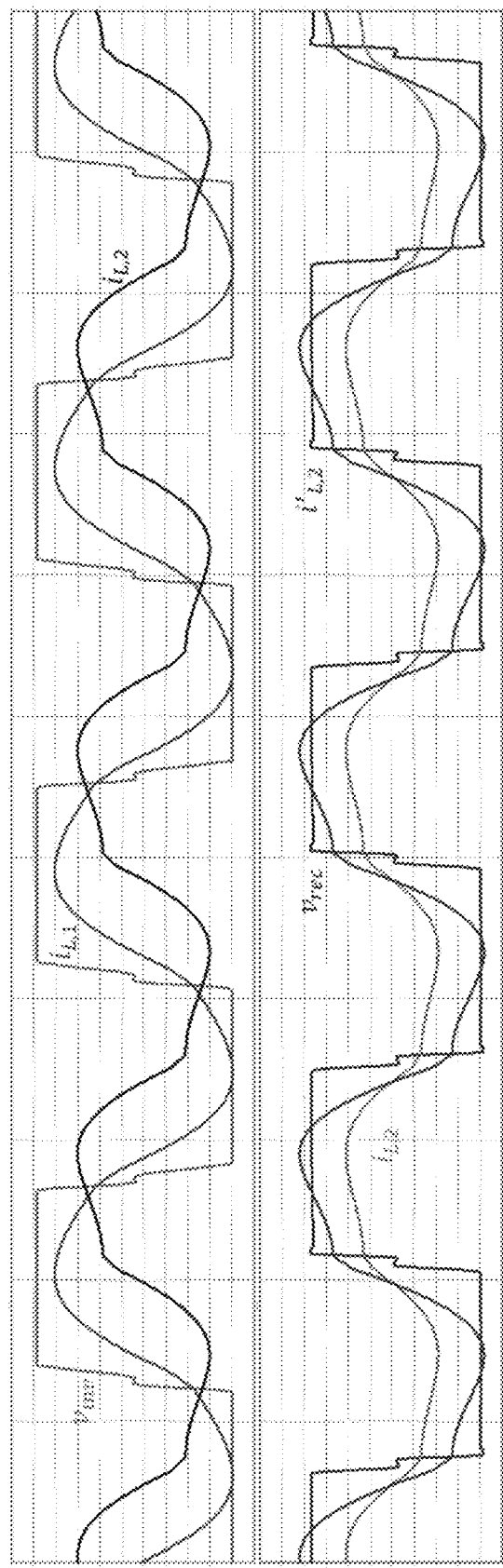

FIG. 15 shows exemplary simulation result for operating point 1 in the load profile of FIG. 14.

Figure 16:
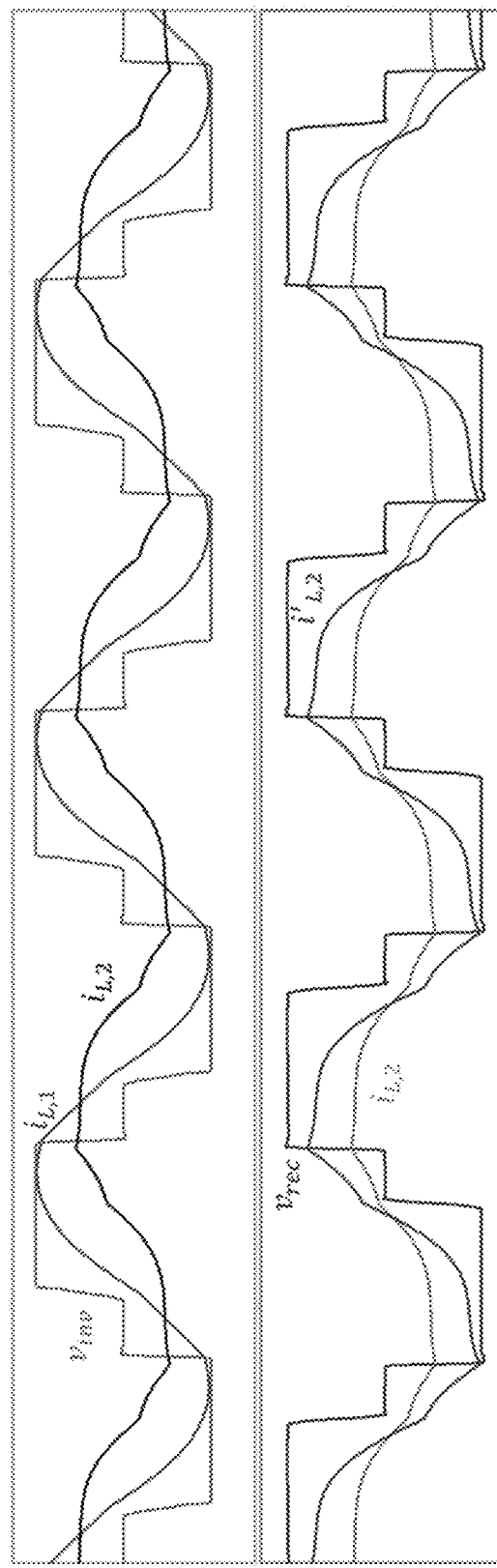

FIG. 16 shows exemplary simulation result for operating point 2 in the load profile of FIG. 14.

Figure 17:
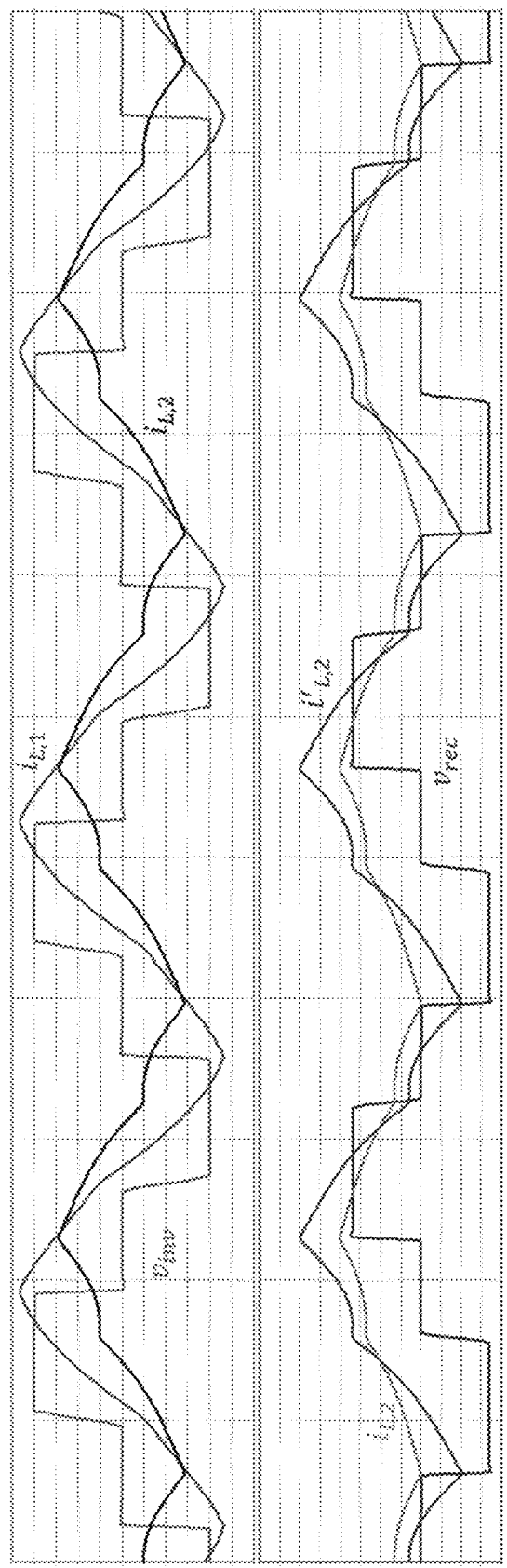

FIG. 17 shows exemplary simulation result for operating point 3 in the load profile of FIG. 14.

Figure 18:
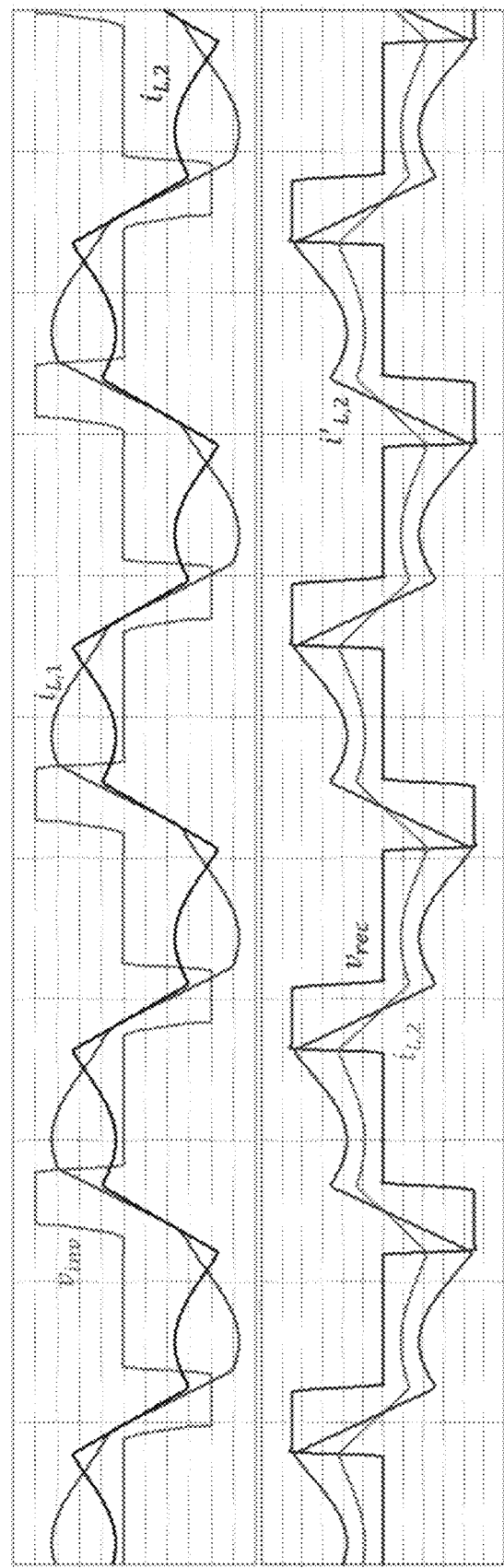

FIG. 18 shows exemplary simulation result for operating point 4 in the load profile of FIG. 14.

Figure 19:
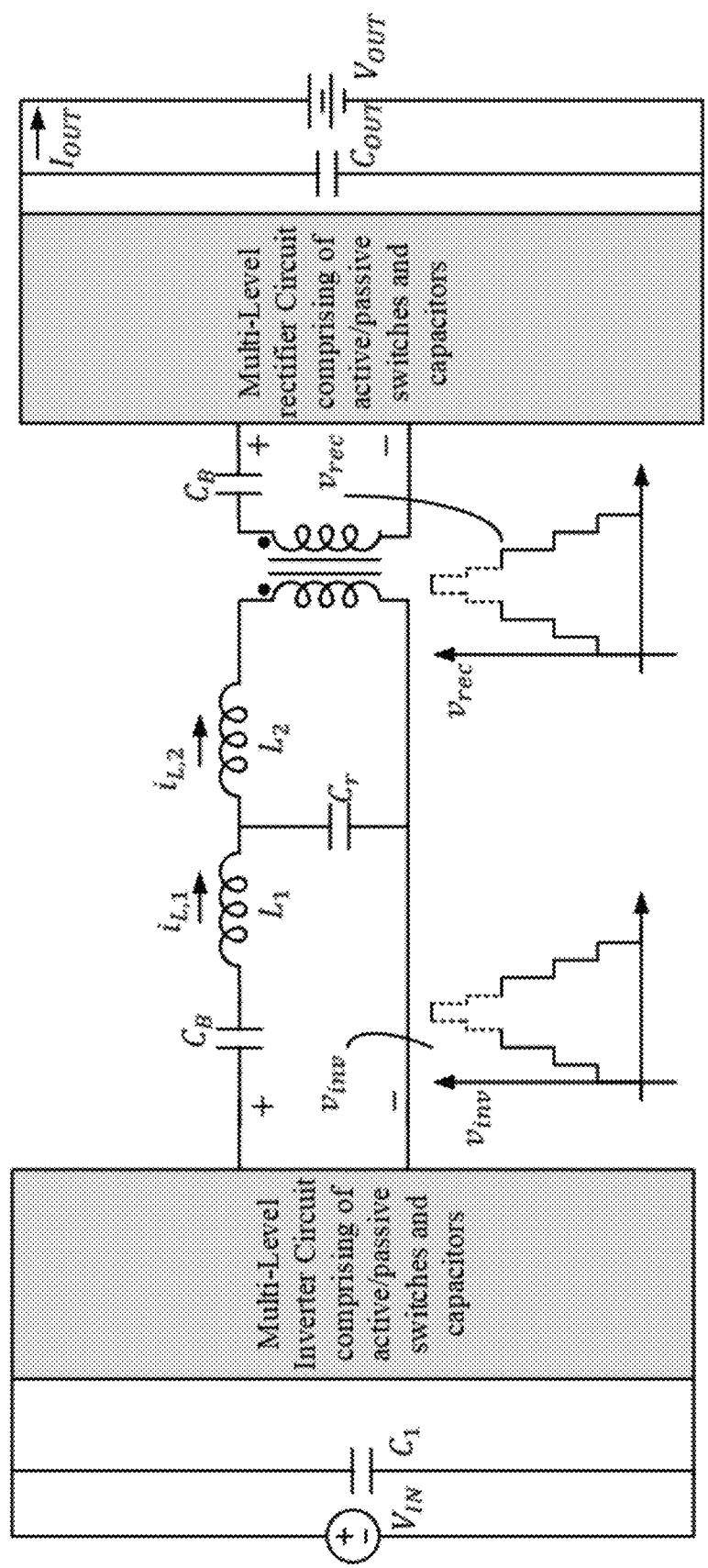

FIG. 19 shows a generalized DC-DC converter deploying the LCL-T resonant network with multi-level inverter or rectifier switching network.

Figure 20:
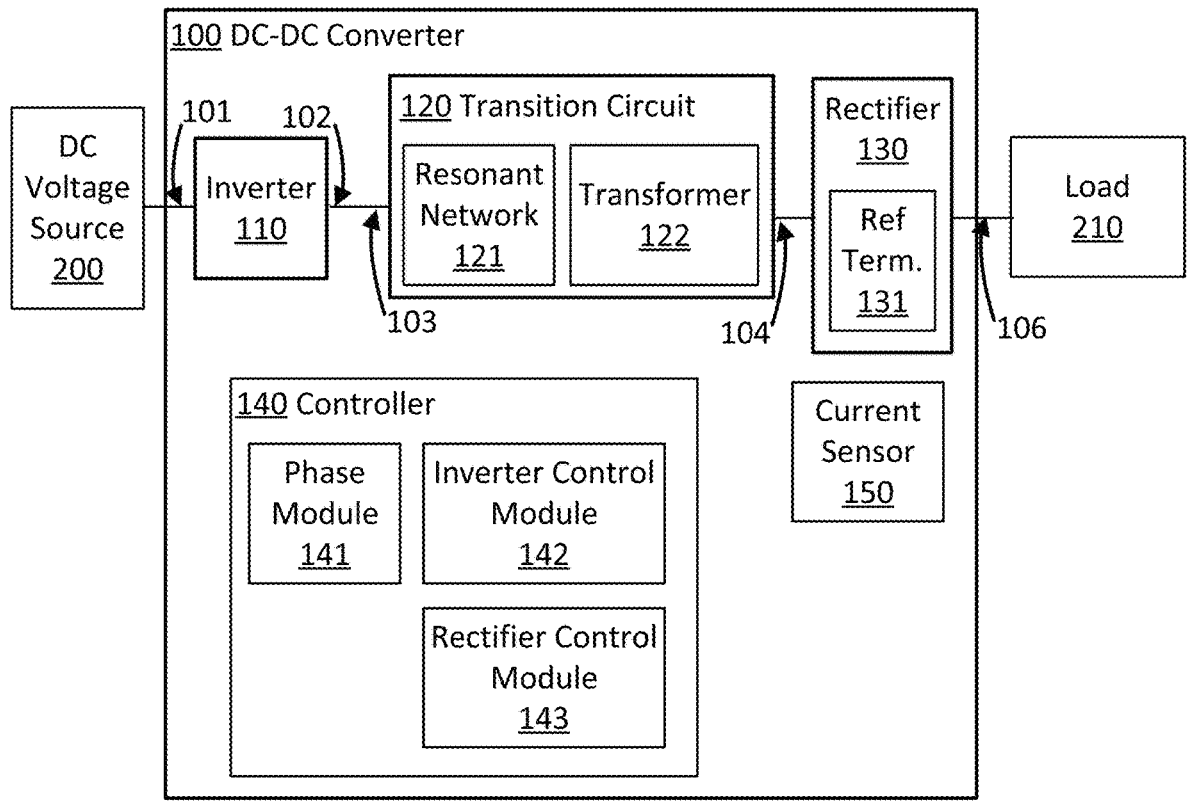

FIG. 20 is a block diagram of a DC-DC converter according to some embodiments.

Figure 21:
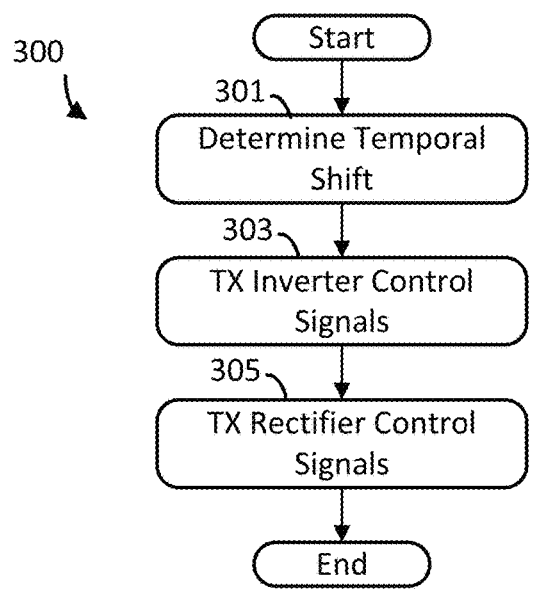

FIG. 21 is a flow diagram of a method for controlling a DC-DC converter including an inverter, resonant network, and rectifier according to some embodiments.

Figure 22:
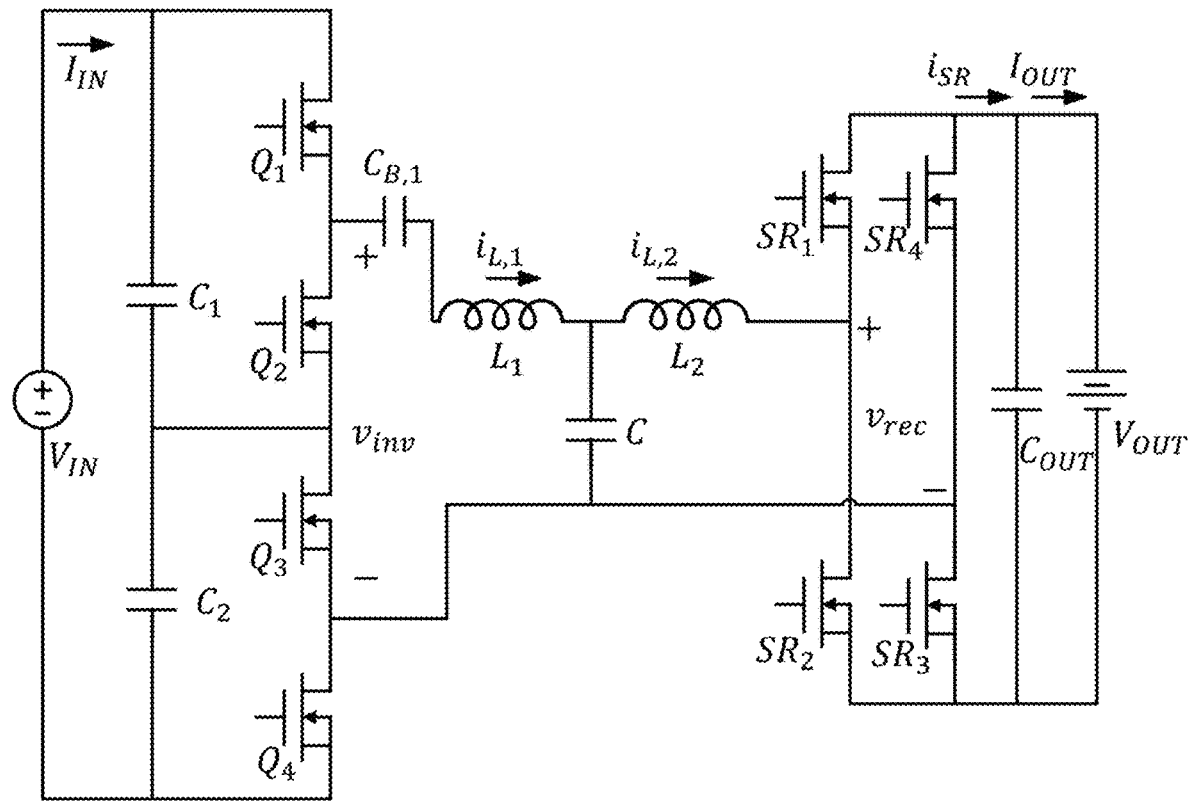

FIG. 22 is a circuit diagram of a DC-DC converter according to some embodiments.

DETAILED DESCRIPTION

FIG. 1A shows an isolated DC-DC converter deploying LCL-T resonant network. The high frequency inverter includes two stacked half bridges. They generate $v_{inv}$ at the input of the resonant tank. In the resonant tank both inductors $L_1$, and $L_2$ resonate with capacitor $C_r$ at the switching frequency $f_s$:

$$f_s = \frac{1}{2\pi\sqrt{L_1 C_r}} = \frac{1}{2\pi\sqrt{L_2 C_r}} \tag{2}$$

Figure 1C:
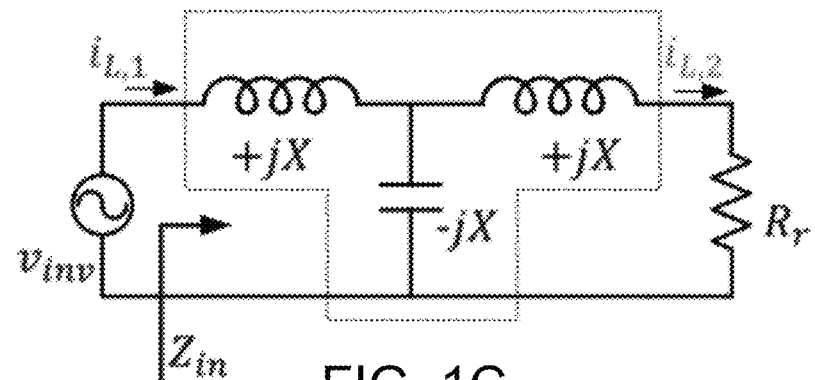

Hence, at the switching frequency, if the reactance of $L_1$ and $L_2$ is assumed equal to jX, then the capacitor $C_r$ offers a reactance of −jX. The inductor current $i_{L,2}$ is then passed through a high frequency transformer with a high magnetizing inductance and finally rectified and filtered using a capacitive filter $C_{OUT}$ to generate DC output voltage and current. A full-bridge version of the rectifier is used in FIG. 1A. Capacitors $C_B$ at the inverter and rectifier side serves the purpose of DC blocking and can offer a reactance much smaller than −jX at the switching frequency. Therefore, the presence of blocking capacitors $C_B$ does not affect the resonant operation. FIG. 1B shows the same resonant DC-DC converter, with the exception that the rectifier is a stacked half bridge. In FIG. 1C, the resonant tank is shown under fundamental harmonic approximation. Fundamental harmonic analysis or, sinusoidal approximation is a useful tool for analysis of resonant converters. Since, a high Q (quality factor) resonant tank strongly rejects high frequency excitations and therefore only lets the fundamental component of the excitation overlapping with resonant frequency pass through the network, the switching waveform at the input of the resonant network can be approximated as a sinusoidal source. The amplitude of this source is dictated by the Fourier series of the square wave excitation. Similarly the rectifier can be modeled as a reflected resistive impedance when operated using synchronous rectification as indicated in [6]. It is important to note that, the input impedance of the LCL-T resonant network is given as:

$$Z_{in} = jX + (-jX \| (jX + R_r)) = \frac{X^2}{R_r} \tag{3}$$

Hence, at the resonant frequency, the resonant tank offers a resistive input impedance. The input impedance magnitude is also controlled by reactance "X", which is a design variable. Due to the resistive input impedance, this resonant tank inherently minimizes circulating energy in the converter as well. Furthermore, from the solution and power balance of the passive network shown in FIG. 1C current $i_{L,2}$ can be found as:

$$\hat{i}_{L,2} = \frac{2V_{IN}}{\pi X} \angle -\frac{\pi}{2} \tag{4}$$

Figure 1D:
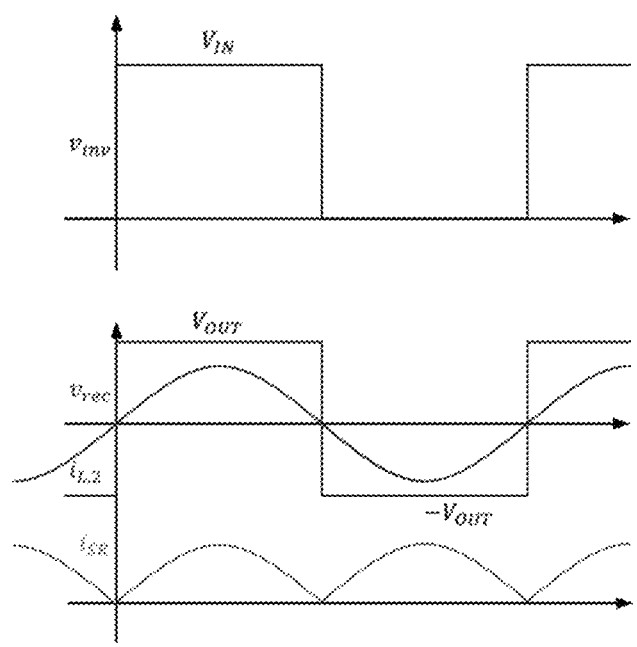

It is assumed that the inverter excitation is a perfect square wave as shown in FIG. 1D with a DC value of $$\frac{V_{IN}}{2}$$

and amplitude of the fundamental equal to $$\frac{2V_{IN}}{\pi}.$$

Furthermore, on the rectifier side, it is assumed that synchronous rectification is deployed as shown in FIG. 1D. As can be seen from Eq. (4), output current $I_{OUT}$ of the resonant network is independent of the output voltage and only depends on converter input voltage $V_{IN}$ and resonant tank design, i.e. by properly selecting the value of reactance X. Consequently the DC output current is also independent of output voltage. For a full bridge rectifier, $I_{OUT}$ can be calculated from the average value of $i_{SR}$—which is the rectified and transformed (using the high frequency transformer) version of $i_{L,2}$, as shown in FIG. 1D and is given by:

$$I_{OUT} = \frac{2n}{\pi}\hat{i}_{L,2} = \frac{4nV_{IN}}{\pi^2 X} \quad (5)$$

where n is the transformer turns ratio.

For a stacked half bridge rectifier, shown in FIG. 1B, which essentially acts as a voltage doubler, the output current can be expressed as:

$$I_{OUT} = \frac{n}{\pi}\hat{i}_{L,2} = \frac{2mV_{IN}}{\pi^2 X} \quad (6)$$

Figure 2:
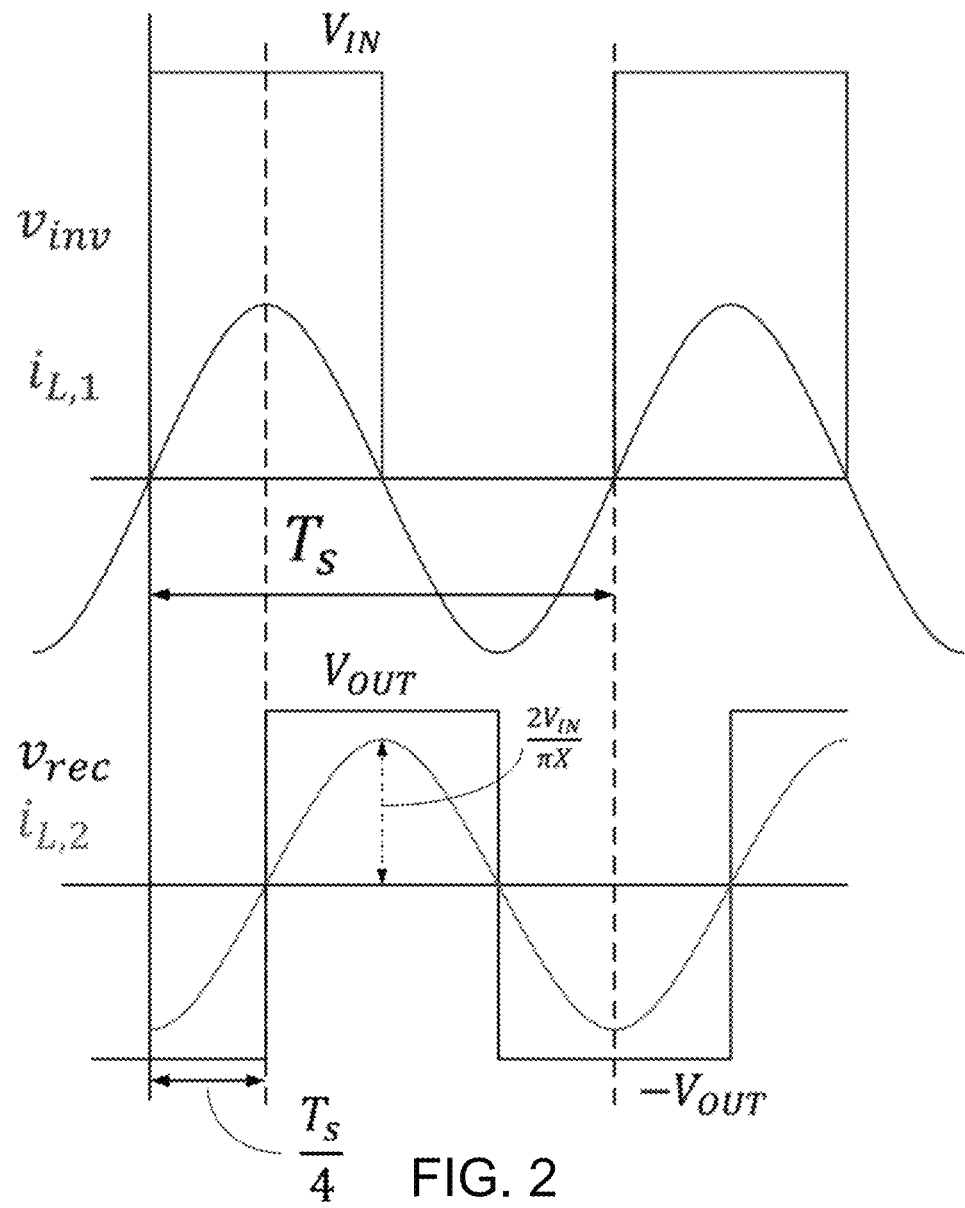
FIG. 2 shows a detailed timing diagram of inverter switching node voltage $v_{inv}$, $L_1$ inductor current $i_{L,1}$, which can also be referred to as the inverter side inductor current, $L_2$ inductor current $i_{L,2}$, which can also be referred to as the primary reflected rectifier side inductor current, and rectifier switching node voltage $v_{rec}$ under synchronous rectification. It is important to note that the resonant tank offers resistive inverter input voltage independent of the load. Hence the zero crossing of the inductor currents overlaps with the switching node voltages. Also, current $i_{L,2}$ has a constant time delay of $$\frac{T_s}{4}$$

Furthermore, as shown in FIG. 2 and also indicated by Eq. (4), achieving synchronous rectification for such a resonant converter is simple as the phase of $L_2$ inductor current $i_{L,2}$ always lags the inverter side voltage by $\pi/2$. Thus, no high frequency current sensing is required to perform synchronous rectification.

It is important to note that this network behaves as a constant voltage-to-current gain tank, as is evident from the input voltage to output current relations presented in Eqs. (5) and (6). Hence, for a load which requires constant output current over a wide range of output voltage, no control is necessary for such networks. However, for any practical load, reduced output current operation is required for constant power profile or light load operation across a wide range of output voltages.

In pursuit of an efficient modulation scheme for reduced current operation of LCL-T resonant networks (or the broader category—immittance networks), first approach is to reduce the excitation at the input of the resonant tank. In FIG. 3A, it is shown how a three-level modulation can change voltage $v_{inv}$. From the Fourier series analysis it can be found that the fundamental harmonic of the voltage waveform shown in FIG. 3A is given by:

$$\hat{v}_{inv,fund} = \frac{(1 + \cos \emptyset)}{\pi} V_{IN} \quad (7)$$

From Eq. (7) it can be seen that by using the phase-shift control variable Ø, which essentially controls the length of the interval where $v_{inv}=V_{IN}/2$, one can regulate the excitation amplitude at the input of the resonant tank. With this reduced excitation, the output current can be solved as:

$$I_{OUT} = \frac{2n\cos^2\frac{\emptyset}{2}V_{IN}}{\pi^2 X}; \text{ for full bridge rectifier} \quad (8)$$

$$I_{OUT} = \frac{2n\cos^2\frac{\emptyset}{2}V_{IN}}{\pi^2 X}; \text{ for half bridge rectifier} \quad (9)$$

Hence, the aim of achieving controllability over the output current is achieved by the use of three-level modulation as shown in FIG. 3A and Eqs. (8) and (9). To balance the capacitor voltages in stacked half bridge inverter and simultaneously achieve equal current stress on the devices, a period doubling modulation strategy can be deployed as shown in FIG. 3B and explained in [7], where the relative phase between gate pulses for switch $Q_4$ and $Q_1$ alternates between two consecutive switching cycles. However, this control strategy alone is detrimental to the converter performance. As indicated in FIG. 3A, since the inverter input impedance of the LCL-T network still behaves as a pure resistor, the zero crossing of inductor current $i_{L,1}$ is aligned with the zero crossing of $v_{inv,fund}$—which is time shifted by $$\frac{\emptyset}{4\pi}T_s$$

from the first switching transition. As a result, although the first switching transition of $v_{inv}$ achieves ZVS relatively easily, for the second switching transition, ZVS is lost. Similarly third switching transition achieves ZVS but the fourth transition fails to achieve ZVS. This can cause impediments in high frequency realization of the resonant converter. Hence, some embodiments relate to a method which ensures ZVS at all switching transitions while regulating the output current.

Fundamental to the proposed modulation strategy is the deviation from synchronous rectification on the rectifier side. If the rectifier voltage is advanced in phase from the inductor current $i_{L,2}$, rectifier switching nodes can still achieve zero voltage switching. In this scenario, the linear circuit under fundamental harmonic approximation can be illustrated as shown in FIG. 4A. Here, instead of a resistor, the rectifier port is also shown as a voltage source, which has controllable phase and a transformation factor "n" provided by the transformer. The circuit in FIG. 4A can be solved using superposition principle for currents $i_{L,1}$ and $i_{L,2}$. It is important to keep in mind that the objective is to change the phase of $i_{L,1}$ which can provide soft switching of the inverter devices. First in FIG. 4B, the rectifier source is turned off and the circuit is analyzed with only the inverter source active. It should be noted that when the rectifier port is shorted, the input impedance seen at the inverter port is:

$$Z_{in}=jX+(-jX\|jX)=\infty \quad (10)$$

Hence, the current $\hat{I}_{L,1}$ for excitation $v_{inv,fund}$ is zero. This realization also directly implies that $$\hat{I}_{L,2} = \frac{\hat{V}_{inv,fund}}{jX} = \frac{|\hat{V}_{inv,fund}|}{X} \angle \hat{V}_{inv,fund} + \frac{\pi}{2} \quad (11)$$

Similarly when the analysis is done for the rectifier source active and inverter source turned off as shown in FIG. 4C, the input impedance from the rectifier port becomes infinite and thus current $\hat{I}_{L,2}$ is not dependent on $n\hat{V}_{rec,fund}$. However, current $\hat{I}_{L,1}$ is only influenced by $n\hat{V}_{rec,fund}$ and is given as:

$$\hat{I}_{L,1} = \frac{n\hat{V}_{rec,fund}}{jX} = \frac{|n\hat{V}_{rec,fund}|}{X} \angle \hat{V}_{rec,fund} - \frac{\pi}{2} \quad (12)$$

This is a distinguishing feature of the resonant tank that inverter current $i_{L,1}$ is only influenced by the rectifier voltage and vice versa, which can be used to influence the phase of the inverter current to achieve ZVS of all switching devices. It should be noted that this feature is only true for LCL-T networks (or immittance networks) and in general not applicable to series resonant or LLC converters, which makes it difficult for these converter types to achieve ZVS across the entire load range.

FIG. 5 shows how inverter side voltage $v_{inv}$ determines primary reflected rectifier side inductor current $i_{L,2}$. As indicated earlier, the fundamental of the inverter voltage $v_{inv,fund}$ has a zero crossing (marked at $t_1$) which is time delayed by $$\frac{\phi}{4\pi}T_s$$

from the switching transition marked at $t_0$. The amplitude of this voltage waveform can be controlled by phase-shift angle "Ø". The resultant primary reflected rectifier current $i_{L,2}$ has an amplitude of $$\frac{2\cos^2\frac{\phi}{2}}{\pi X}V_{IN},$$

which is controllable by the phase-shift angle. More importantly the zero crossing of $i_{L,2}$ is delayed in time by $$\frac{T_s}{4},$$

i.e. phase-shifted by $$\frac{\pi}{2}$$

from the zero crossing of the inverter fundamental voltage $v_{inv,fund}$.

Further, FIG. 6 shows how rectifier voltage $v_{rec}$ is synthesized. Since inverter side inductor current $i_{L,1}$ leads rectifier voltage $v_{rec,fund}$ by $$\frac{\pi}{2}$$

according to Eq. (12) and to achieve full ZVS at the inverter side, it is required for zero crossing of inductor current $i_{L,1}$ to lag the zero crossing of inverter voltage $v_{inv,fund}$ by $$\frac{\phi}{4\pi}T_s.$$

Therefore, the zero crossing of rectifier voltage $v_{rec,fund}$ needs to lag the zero crossing of inverter voltage $v_{inv,fund}$ by $$\frac{\phi}{4\pi}T_s + \frac{T_s}{4}.$$

As a consequence, this implies having the zero crossing of the fundamental harmonic of rectifier side voltage $$\frac{\phi}{4\pi}T_s$$

lagging the inductor current $i_{L,2}$ zero crossing as indicated in FIG. 6. Modulation of the rectifier can be done using two-levels or three-levels. Three-level rectification offers symmetry and higher controller sensitivity for current reduction. Three-level switching also results in reduced circulating energy and conduction losses in the passive resonant network. Hence three-level switching can be chosen in general for such converters on the rectifier side. For three-level switching, as shown in FIG. 6, one transition of the rectifier switching happens at near zero current. So, switching losses are mitigated, but the other switching transition happens at higher current, resulting in a certain degree of turn-off loss. However, for wide band gap semiconductors, the turn-off losses can be significantly small. In general, this modulation strategy reduces voltage-current overlap turn-off loss by half with the use of the phase-shift modulation.

Finally, FIG. 7 shows a complete timing diagram of the inverter and rectifier side switching node voltages and inductor currents. The zero voltage switching transitions of all the switches are marked to increase clarity. To illustrate the implementation of gating signals for the full bridge rectifier, FIG. 8 shows the timing diagram of the full bridge rectifier with the phase-shift control variable for only three-level rectifier switching.

Furthermore, as mentioned earlier, it is important to understand that the rectifier can have three-level switching or two-level switching to achieve ZVS of the inverter side switches.

One important distinction is in the form of the timing instant. Since the zero crossing of the fundamental voltage harmonic of the rectifier switching node voltage $v_{rec,fund}$ always needs to lag inductor current $i_{L,2}$ by $$\frac{\phi}{4\pi}T_s,$$

the two-level switching transition aligns with this zero crossing interval of the fundamental voltage $v_{rec,fund}$. For three-level switching the two transitions are time-shifted (leading and lagging) from the zero crossing. This feature is shown in FIGS. 9A and 9B. In FIG. 9A, the three-level rectifier switching is illustrated, and in FIG. 9B, the two-level switching is shown. Another important distinction is the average output current. For three-level switching the DC output current can be obtained as:

$$I_{OUT} = \frac{2}{T_s}\int_{\frac{\phi}{2\pi}T_s}^{\frac{T_s}{2}} i'_{L,2}dt = \frac{4n\cos^4\frac{\phi}{2}V_{IN}}{\pi^2 X} \quad (11)$$

However, for two-level switching from FIG. 9B the DC output current can be found as:

$$I_{OUT} = \frac{2}{T_s}\int_{\frac{\phi}{4\pi}T_s}^{\frac{T_s}{2}+\frac{\phi}{4\pi}T_s} i'_{L,2}dt = \frac{4n\cos^3\frac{\phi}{2}V_{IN}}{\pi^2 X} \quad (12)$$

From Eqs. (11) and (12) it is apparent that to achieve the same output current two-level switching would have to apply more phase shift control compared to the control action required for three-level switching. However, for three-level switching the inductor current amplitudes are given as:

$$\hat{i}_{L,2} = \frac{4n\cos^2\frac{\phi}{2} V_{OUT}}{\pi X} L\phi;\ \hat{i}_{L,2} = \frac{2\cos^2\frac{\phi}{2} V_{IN}}{\pi X} L\frac{\phi}{2} + \frac{\pi}{2} \quad (13)$$

Whereas, two-level switching results in inductor current amplitudes given by:

$$\hat{i}_{L,1} = \frac{4n V_{OUT}}{\pi X} L\phi;\ \hat{i}_{L,2} = \frac{2\cos^2\frac{\phi}{2} V_{IN}}{\pi X} L\frac{\phi}{2} + \frac{\pi}{2} \quad (14)$$

Hence, from Eq. (14) it is apparent that two-level switching will give rise to asymmetric current stress on the inverter and rectifier inductors whereas from Eq. (13) it is seen that the three-level switching can result in balanced current distribution between the two inductors. Furthermore, FIG. 10 illustrates the trade-off in control action for all three control strategies. As illustrated earlier, for the same amount of current reduction, two-level switching requires more control effort and reduced current stress on inductor $L_2$ but higher current stress inductor $L_1$ compared to three-level switching. Whereas, the use of three-level switching only at the inverter side, despite the maximum control effort requirement, fails to achieve ZVS of the inverter side devices.

The proposed modulation for stacked half bridge output rectifier is explained in detail in FIG. 11. It is important to note how the gating of the SHB rectifier in FIG. 12. To balance the device RMS current stress and the capacitor voltages, period doubling modulation is utilized here as well.

It is also useful to note that any inverter and rectifier structure capable of producing three-level and two-level voltages as a combination are well suited for the proposed modulation strategy. Two example circuits are shown in FIGS. 13A through 13D with corresponding voltage and current waveforms. However, the application of the proposed modulation strategy is not limited to the drawn circuits but can be expanded to Flying Capacitor Multi-Level (FCML) converters, Neutral Point Clamped converters, or any kind of switching cells implemented as an inverter or rectifier.

FIG. 14 shows a typical V-I load profile for a DC-DC converter. This load profile has a constant current region where no control action is required for an immittance resonant network. Furthermore the profile contains constant power and constant voltage regions. The converter needs to operate at all operating points inside the boundary of the load profile. This load profile requires current control of an immittance network for which the proposed phase-shifted modulation strategy is a suitable candidate. First in FIG. 14 four distinct operating points are identified and labeled as OP1, OP2, OP3 and OP4.

In OP1 as shown in FIG. 15 the converter operates in constant current mode hence no control action is required. This is evident from the fact that a two-level waveform is utilized at both inverter and rectifier side. All switches achieve ZVS In OP2 the converter operates in CP mode. Depending on the output voltage, the current needs to be reduced to maintain the constant power output of the circuit. In FIG. 17 the action of the phase-shift control is evident. Adequate phase-shift according to Eq. (11) provides control of the power. Also, according to the proposed modulation strategy all bridges switches achieve ZVS.

Next, OP3 is where the load is reduced from maximum power as shown in FIG. 17. The utilization of the proposed modulation strategy helps maintain ZVS at this operating point of 50% load.

Finally the converter in OP4 operates with 10% load. According to the waveforms shown in FIG. 18 all the switches still achieve ZVS FIG. 19 shows a generalized switching network around the LCL-T resonant network. The "n" level inverter voltage or rectifier voltage can be used to regulate the power flow control as described earlier using the example of 3 level voltage excitations. The exact same phase-shift based fixed frequency modulation strategy disclosed in one embodiment of the present disclosure can be utilized to achieve ZVS of all switching transitions in this "n" level DC-DC converter.

FIG. 20 shows a DC-DC converter 100 according to some embodiments. Converter 100 includes an inverter 110, a transition circuit 120, a rectifier 130, and a controller 140. Converter 100 converts source voltage from a DC voltage source 200 and converters it to an output voltage delivered to a load 210. Load 210 may be a battery, a resistive load, reactive load, or any other suitable load or combination of loads.

Inverter 110 is a suitable inverter circuit having a voltage source terminal 101 and an inverter output terminal 102. Inverter 110 also has a number of switches that when switched in a suitable sequence will produce a time varying inverter output voltage at an output terminal. Any suitable inverter circuit may be used such as (for example and not limitation) a stacked half bridge or a full-bridge as shown in earlier figures. It should be appreciated that the specific switching sequence to achieve a specific voltage output at the inverter output terminal is dependent upon the specific inverter circuit of the embodiment. Those of skill in the art will readily appreciate, however, once the inverter circuit is defined, there is a finite set of possible switch configurations each of which is either unusable (e.g., because it causes an electrical short) or produces a particular voltage at the inverter output terminal. The term "state" is used to refer to a particular combination of the switches being "on" or "off". For example, for the stacked half bridge shown in FIG. 1A there are four switches, and thus sixteen possible states.

It is further appreciated that some switch configuration may produce the same output voltage and thus it may be an arbitrary choice as to which switch configuration is used to produce that output voltage if and when desired. In some embodiments, some or all of such states are cycled through in order to achieve even wear of inverter 110.

It is noted that one of skill in the art would readily appreciate that although terminals 101 and 102 are shown as a single line in FIG. 20, these terminals each have at least two connections (e.g., positive terminal and negative terminal). Those of skill in the art will readily appreciate the appropriate interpretation of the word "terminal" from the context as well as the number of connections that may be required to connect to a "terminal" or "port".

The inverter output terminal 102 is electrically connected the input terminal 103 of transition circuit 120. In some embodiments, inverter output terminal 102 is electrically connected to input terminal 103 through a blocking capacitor (not shown). Transition circuit 120 may include a resonant network 121 and a transformer 122. Resonant network 121 may be an LCL-T network as discussed in connection with, for example, FIG. 1A. Transformer 122 may be any suitable transformer, such as that discussed in connection with, for example, FIG. 1A. In some embodiments a port of the resonant network 121 is connected to inverter output terminal 102, with the second port of resonant network 121 connected to transformer 122. In some other embodiments, transformer 122 is connected to inverter output terminal 102, with the second terminal of the transformer connected to resonant network 121. Said differently, in some embodiments inverter 110 is followed by resonant network 121, which is followed by transformer 122, while in some other embodiments inverter 110 is followed by transformer 122, which is followed by resonant network 121. Though any suitable transition circuit 120 may be used.

The transformer may function as a voltage and current transformation network (well understood by personnel skilled in the art) as well as the isolating element. In some embodiments, the transition circuit does not include a transformer. The transformer may be omitted, for example, if the application does not require galvanic isolation. FIG. 22 shows an example circuit of a DC-DC converter that does not include a transformer.

An output terminal 104 of transition circuit 104 is electrically connected to rectifier 130. Rectifier 130 has a number of switches that are used to convert the output of transition circuit 120 into a DC output voltage on converter output terminal 106. Any suitable rectifier circuit may be used such as (for example and not limitation) a stacked half bridge or a full-bridge circuit as shown in earlier figures. In some embodiments, an output capacitor is connected across converter output terminal 106 (see e.g., FIG. 13A).

Rectifier 130 has an internal reference terminal 131; the rectifier switches may be switched to achieve a desired voltage at reference terminal 131 during operation. It should be appreciated that, the specific configuration of the rectifier switches needed to achieve the desired voltage at reference terminal 131 is specific to the embodiment. Like inverter 110, however, once the switch topology of rectifier 130 is defined the output to reference terminal 131 is readily determined.

Controller 140 may be used to control the switches of inverter 110 and the switches of rectifier 130. Controller 140 includes a phase module 141, an inverter control module 142, and a rectifier control module 143. Modules 141-143 may be implemented in hardware, software, or any suitable combination thereof. Any software portion of a module may be stored as computer-executable instructions in a non-volatile computer-readable storage memory. One or more processors may be operably connected to the memory to execute the computer executable instructions. In some embodiments, aspects of the modules are implemented in an ASIC, FPGA, or other dedicated hardware. Though, these are just examples, and any suitable implementation of the modules may be used.

Phase module 141 determines a temporal shift that the voltage at inverter output terminal 102 relative to a change in state of the inverter switches. A phase shift of Ø/2 is used to characterize the temporal shift. It should be appreciated that the temporal shift may be characterized as a portion of a period of the fundamental frequency or in any other suitable way. Phase module 141 determines the temporal shift at least in part based on a reference quantity obtained by controller 140. Any suitable reference quantity may be used by phase module 141. In some embodiments, the reference quantity is the current at the converter output terminal 106. In some embodiments, the reference quantity is another current reference. In some embodiments, the reference quantity is the input voltage at terminal 101 (nominally the voltage of DC voltage source 200). In still some other embodiments, the reference quantity is an output voltage reference.

In some embodiments, DC-DC converter 100 includes a current sensor 150. Current sensor 150 may measure the current at converter output terminal 106. The current measured by current sensor 150 may thus be used by phase module 141 as the reference quantity. In one such embodiments, phase module 141 has a feedback loop that controls the temporal shift using an error signal that is a difference between a target output current and the measured output current. The target output current may be determined by a V-I relationship for load 210. For example, load 210 and converter 100 may communicate digitally to communicate the applicable V-I relationship upon connection of load 210 to converter 100.

The inverter control module 142 is operably connected to control the switches of inverter 110. Inverter control module 142 transmits inverter control signals that control respective switches of inverter 110. For example, each control signal may be used to specify whether a particular switch (or set of switches) is "on" or "off". Inverter control module 142 changes the state of the inverter switches in a sequence that produces a desired voltage at inverter output terminal 102. FIG. 3B shows an example of such a sequence of states to produce the $v_{inv}$ voltage shown in FIG. 3A. It is noted that the sequence of states in FIG. 3B is for the stacked half bridge inverter shown in FIGS. 1A and 1B and the corresponding labelled switches $Q_1$-$Q_4$. Those of skill in the art will readily appreciate that different inverter circuits will require different switching sequences based on how each desired output voltage is achieved with the specified inverter circuit. The sequence of states (including each states respective duration) needed for a particular inverter circuit can be determined from the circuit topology, the desired temporal shift, the fundamental frequency of the modulation, and the number of voltage levels desired for the modulation. In some embodiments three or more discrete voltage levels are desired for the modulation of the inverter output voltage.

The sequence of states excited on the inverter switches produces an inverter voltage signal at inverter output terminal 102 having a fundamental frequency component with the phase shift of Ø/2 relative to the first stage change in the sequence. Referring to FIGS. 3A and 3B we note the zero crossing of $v_{inv,fund}$ (at time at $t_1$) has a phase shift of Ø/2 relative to the first state change at time to (corresponding to the vertical axis in FIG. 3B).

Attention is now turned to rectifier control module 143 which is operably connected to control the switches of rectifier 130. Rectifier control module 143 transmits rectifier control signals that control respective switches of rectifier 130. The rectifier control signals switch the rectifier switches in a sequence that produces a desired voltage at reference terminal 131 having the same fundamental frequency as the voltage output by inverter 110 except that it is time shifted by an additional phase, ψ. In some embodiments q is in the range $(\pi+\emptyset)/2 \leq \psi \leq$ and $\pi+\emptyset/2$. It should be appreciated that if ψ is less than $(\pi+\emptyset)/2$, the soft switching condition may no longer be met. The case of $\psi=(\pi+\emptyset)/2$ is illustrated in FIG. 6. Note that the total phase shift of $v_{rec,fund}$ in the example of FIG. 6 is $\pi/2+\emptyset$. Similar to control of the inverter switches, the sequence of states (including each states respective duration) output by rectifier control module 143 can be determined from the circuit topology of rectifier 130, the desired temporal shift, the fundamental frequency of the modulation, and the number of voltage levels desired for the modulation. In some embodiments two or more discrete voltage levels are desired for the modulation of the voltage at the rectifier reference terminal.

In some embodiments, the rectifier may include a plurality of relays electrically connected to the plurality of rectifier switches such that if the plurality of relays are in a first state the plurality of rectifier switches form a full bridge rectifier and if the plurality of relays are in a second state the plurality of rectifier switches form a stacked half bridge rectifier. In some embodiments, the controller operably connected to control the plurality of relays and further including a rectifier control module to signal to the plurality of rectifier switches to operate in the first state if the output voltage is greater than a threshold voltage and to signal to the plurality of rectifier switches to operate in the second state if the output voltage is below the threshold voltage.

FIG. 21 shows a flow diagram of a method 300 for controlling a DC-DC converter having an inverter, resonant network, and rectifier.

At step 301, method 300 determines a temporal shift equivalent to a first phase shift, $\varnothing/2$, based at least in part on a reference quantity.

At step 303, method 300 transmits a plurality of inverter control signals to control a plurality of inverter switches of the inverter in a first sequence to produce an inverter voltage signal having a first fundamental frequency component at an output terminal of the inverter, the first fundamental frequency component having the first phase shift, $\varnothing/2$, relative to a first state change in the first sequence; and At step 305, method 300 transmits a plurality of rectifier control signals to a plurality of rectifier switches of the rectifier in a second sequence to produce a rectifier voltage signal having a second fundamental frequency component at a reference terminal of the rectifier, the second fundamental frequency component having a same frequency as the first fundamental frequency component, the second fundamental frequency component phase shifted by a second phase shift, $\psi$, relative to the first fundamental frequency component, where $(\pi+\varnothing)/2 \leq \psi \leq$ and $\pi+\varnothing/2$.

In some embodiments, the rectifier includes a plurality of relays electrically connected to the plurality of rectifier switches, wherein the method of the present disclosure includes determining if the output voltage is greater than a threshold voltage. If the output voltage is greater than the threshold voltage, the controller sends a first plurality of relay control signals to a plurality of relays in the rectifier to configure the rectifier as a full bridge rectifier. If the output voltage is less than the threshold voltage, the controller sends a second plurality of relay control signals to the plurality of relays in the rectifier to configure the rectifier as a stacked half bridge rectifier.

It should be appreciated that steps 301, 303, and 305 may be performed simultaneously and substantially on a continuous basis during operation of the DC-DC converter being controlled. In some embodiments, method 300 is implemented at least in part as modules such as those discussed in connection with controller 140.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A DC-DC converter for delivering energy from a DC voltage source to a load while providing soft switching and current control, the DC-DC converter comprising:
   an inverter having a plurality of inverter switches, a voltage source terminal for connecting to the DC voltage source, and an inverter output terminal;
   a circuit comprising a resonant network, the circuit electrically connected to the inverter output terminal;
   a rectifier electrically connected to the circuit, the rectifier having a plurality of rectifier switches, a reference terminal, and a converter output terminal; and
   a controller operably connected to the plurality of inverter switches and operably connected to the plurality of rectifier switches, the controller comprising:
   a phase module to determine a temporal shift equivalent to a first phase shift, $\varnothing/2$, based at least in part on a reference quantity;
   an inverter control module to transmit a plurality of inverter control signals to the plurality of inverter switches, each inverter control signal capable of controlling a respective one or more of the inverter switches, the inverter control module further to, during operation, change states of the plurality of inverter control signals in a first sequence to produce an inverter voltage signal at the inverter output terminal having a first fundamental frequency component with the first phase shift, $\varnothing/2$, relative to a first state change in the first sequence; and
   a rectifier control module to transmit a plurality of rectifier control signals to the plurality of rectifier switches, each rectifier control signal capable of controlling a respective one or more of the rectifier switches, the rectifier control module further to, during operation, change states of the plurality of rectifier control signals in a second sequence to produce a rectifier voltage signal at the reference terminal, the rectifier voltage signal having a second fundamental frequency component, the second fundamental frequency component having a same frequency as the first fundamental frequency component, the second fundamental frequency component phase shifted by a second phase shift, $\psi$, relative to the first fundamental frequency component, where $(\pi+\varnothing)/2 \leq \psi \leq \pi+\varnothing/2$.

2. The DC-DC converter of claim 1, wherein the reference quantity is selected a group consisting of output current, current reference, input voltage, and output voltage reference.

3. The DC-DC converter of claim 1, further comprising a current sensor to measure an output current through the converter output terminal, wherein the reference quantity is the output current.

4. The DC-DC converter of claim 3, wherein the phase module comprises a feedback loop that controls the first phase shift using an error signal that is a difference between a target output current and the measured output current.

5. The DC-DC converter of claim 4, further comprising
a voltage sensor to measure an output voltage at the converter output terminal; and
a non-transient computer-readable storage medium storing a target voltage-to-current relationship, wherein the phase module determines the target output current based on the measured output voltage and the target voltage-to-current relationship for the load.

6. The DC-DC converter of claim 5, wherein
the rectifier further comprises a plurality of relays electrically connected to the plurality of rectifier switches such that if the plurality of relays are in a first state the plurality of rectifier switches form a full bridge rectifier and if the plurality of relays are in a second state the plurality of rectifier switches form a stacked half bridge rectifier; and
the controller operably connected to control the plurality of relays and further comprising a rectifier control module to signal to the plurality of rectifier switches to operate in the first state if the output voltage is greater than a threshold voltage and to signal to the plurality of rectifier switches to operate in the second state if the output voltage is below the threshold voltage.

7. The DC-DC converter of claim 1, wherein the resonant network is a two-port element having:
a first port with a positive first terminal and a negative first terminal;
a second port with a positive second terminal and negative second terminal;
a capacitor having a first end and a second end, the second end of the capacitor connected to the negative first terminal of the first port and the negative second terminal of the second port;
a first inductor having a third end and a fourth end, the third end of the first inductor connected to the positive first terminal of the first port; and
a second inductor having a fifth end and a sixth end, the sixth end of the second inductor connected to the positive second terminal of the second port, and the fifth end of the second inductor connected to the first end of the capacitor and the fourth end of the first inductor.

8. The DC-DC converter of claim 1, wherein
the circuit further comprises a transformer, and
the resonant network of the circuit is electrically connected to the inverter output terminal and the transformer is electrically connected to the resonant network and the rectifier.

9. The DC-DC converter of claim 1, wherein the inverter control module transmits inverter control signals such that each period of the inverter voltage signal comprises three or more discrete voltage levels.

10. The DC-DC converter of claim 9, wherein at least two states of the plurality of inverter control signals produce a first one of the three or more discrete voltage levels and the first sequence output by the inverter control module cycles between the at least two states to produce the first one of the three or more discrete voltage levels.

11. The DC-DC converter of claim 1, wherein the rectifier control module is configured to transmit rectifier control signals such that each period of the rectifier voltage signal comprises two or more discrete voltage levels.

12. The DC-DC converter of claim 1, wherein
the inverter is a stacked half bridge inverter;
the plurality of inverter switches includes a first inverter switch and a second inverter switch;
the plurality of inverter control signals includes a first inverter control signal operably connected to control the first inverter switch, and a second inverter control signal operably connected to control the second inverter switch; and
the controller alternates each period T between (a) the first inverter control signal leading the second inverter control signal by a third phase shift, Ø, equal to twice the first phase shift, and (b) the second inverter control signal leading the first inverter control signal by the third phase shift, Ø.

13. A method for controlling a DC-DC converter having an inverter, a resonant network, and a rectifier, the method comprising:
determining a temporal shift equivalent to a first phase shift, Ø/2, based at least in part on a reference quantity;
transmitting a plurality of inverter control signals to control a plurality of inverter switches of the inverter in a first sequence to produce an inverter voltage signal having a first fundamental frequency component at an output terminal of the inverter, the first fundamental frequency component having the first phase shift, Ø/2, relative to a first state change in the first sequence; and
transmitting a plurality of rectifier control signals to a plurality of rectifier switches of the rectifier in a second sequence to produce a rectifier voltage signal having a second fundamental frequency component at a reference terminal of the rectifier, the second fundamental frequency component having a same frequency as the first fundamental frequency component, the second fundamental frequency component phase shifted by a second phase shift, ψ, relative to the first fundamental frequency component, where $(\pi+Ø)/2 \leq \psi \leq \pi+Ø/2$.

14. The method of claim 13, further comprising measuring an output current through an output terminal of the DC-DC converter, wherein the determining the temporal shift the reference quantity is the output current.

15. The method of claim 14, wherein determining the temporal shift comprises determining the first phase shift from a feedback loop from an error signal that is a difference between a target output current and the measured output current.

16. The method of claim 15, further comprising:
measuring an output voltage at the output terminal of the DC-DC converter; and
determining the target output current based on the measured output voltage and a voltage-to-current relationship for a load connected to the output terminal of the DC-DC converter.

17. The method of claim 16, further comprising:
determining if the output voltage is greater than a threshold voltage;
if the output voltage is greater than the threshold voltage, sending a first plurality of relay control signals to a plurality of relays in the rectifier to configure the rectifier as a full bridge rectifier; and if the output voltage is less than the threshold voltage, sending a second plurality of relay control signals to the plurality of relays in the rectifier to configure the rectifier as a stacked half bridge rectifier.

18. The method of claim 13, wherein each period of the inverter voltage signal comprises three or more discrete voltage levels.

19. The method of claim 18, wherein at least two states of the plurality of inverter control signals produce a same one of the three or more discrete voltage levels and the first sequence output by the inverter control module cycles between the at least two states.

20. The method of claim 13 wherein each period of the rectifier voltage signal comprises two or more discrete voltage levels.

21. The method of claim 13, wherein said transmitting the plurality of inverter control signals
- the inverter voltage comprises three discrete voltage levels, including a low voltage level, a high voltage level, and an intermediate voltage level between the low voltage level and the high voltage level; and
- the first sequence produces at the output terminal of the inverter, for each period, T, of the inverter voltage,
  - (A) the intermediate voltage level for a first time equal to $\emptyset T/(2\pi)$;
  - (B) followed by the high voltage level for a second time equal to $(\pi-\emptyset)T/(2\pi)$;
  - (C) followed by the intermediate voltage level for the first time; and
  - (D) followed by the low voltage level for the second time.

* * * * *